United States Patent
Manolakos et al.

(10) Patent No.: US 11,363,420 B2
(45) Date of Patent: Jun. 14, 2022

(54) REPORTING REFERENCE SIGNAL-RELATED CONSISTENCIES IN SUPPORT OF USER EQUIPMENT POSITIONING

(71) Applicant: QUALCOMM Incorporated, San Diego, CA (US)

(72) Inventors: Alexandros Manolakos, Escondido, CA (US); Jingchao Bao, San Diego, CA (US); Lorenzo Ferrari, Oakland, CA (US); Yih-Hao Lin, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/330,861

(22) Filed: May 26, 2021

(65) Prior Publication Data

US 2021/0377698 A1 Dec. 2, 2021

Related U.S. Application Data

(60) Provisional application No. 63/031,445, filed on May 28, 2020.

(51) Int. Cl.
*H04W 4/029* (2018.01)
*G01S 5/10* (2006.01)
(Continued)

(52) U.S. Cl.
CPC .......... *H04W 4/029* (2018.02); *G01S 5/0236* (2013.01); *G01S 5/10* (2013.01); *H04L 5/0048* (2013.01)

(58) Field of Classification Search
CPC ..... H04W 4/029; H04W 64/00; G01S 5/0236; G01S 5/10; G01S 5/0244; G01S 5/0268; G01S 5/0009; H04L 5/0048; H04L 5/0051
See application file for complete search history.

(56) References Cited

U.S. PATENT DOCUMENTS

| | | |
|---|---|---|
| 2015/0050890 A1 | 2/2015 | Axmon et al. |
| 2017/0094631 A1* | 3/2017 | Pon ........................ G01S 5/0236 |
| 2018/0317107 A1 | 11/2018 | Do et al. |

OTHER PUBLICATIONS

International Search Report and Written Opinion—PCT/US2021/034403—ISA/EPO—dated Oct. 14, 2021.
(Continued)

*Primary Examiner* — Kabir A Timory
(74) *Attorney, Agent, or Firm* — Weaver Austin Villeneuve & Sampson LLP

(57) ABSTRACT

Methods, systems, computer-readable media, and apparatuses are described for reporting, in support of positioning a UE, information about consistencies of positioning reference signal (PRS) measurements, PRS resources, PRS resource sets, or transmission and reception points (TRPs). In some embodiments, a UE receives PRS resources from TRPs and performs PRS measurements based on the PRS resources. The UE determines whether certain PRS measurements, PRS resources, PRS resource sets, or TRPs contribute to a consistent position estimate and/or consistent positioning measurements. The UE reports to a device, such as to a location server, information about consistent groups, where each consistent group identifies a set of such consistent elements.

40 Claims, 10 Drawing Sheets

(51) Int. Cl.
      *G01S 5/02*          (2010.01)
      *H04L 5/00*         (2006.01)

(56)            References Cited

OTHER PUBLICATIONS

Samsung: "DL and UL Reference Signals Design for NR Positioning", 3GPP Draft, 3GPP TSG RAN WG1 #96b, R1-1904394 NR Positioning DL and UL RS Design_SS, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 2, 2019 (Apr. 2, 2019), XP051707199, 15 Pages, Retrieved from the Internet: URL: http://www.3gpp.org/ftp/tsg%5Fran/WG1%5FRL1/TSGR1%5F96b/Docs/R1%2D1904394%2Ezip , [retrieved on Apr. 2, 2019], Sections 2, 3, 4, abstract.

* cited by examiner

REPORTING REFERENCE SIGNAL-RELATED CONSISTENCIES IN SUPPORT OF USER EQUIPMENT POSITIONING

RELATED APPLICATIONS

This application claims the benefit of U.S. Provisional Application No. 63/031,445, filed May 28, 2020, entitled "REPORTING REFERENCE SIGNAL-RELATED CONSISTENCIES IN SUPPORT OF USER EQUIPMENT POSITIONING", which is assigned to the assignee hereof, and incorporated herein in its entirety by reference.

BACKGROUND

1. Field of Disclosure

Aspects of the disclosure generally relate to the field of wireless communications, and more specifically to user equipment (UE) reporting, in support of positioning the UE, information about consistencies of positioning reference signal (PRS) measurements, PRS resources, PRS resource sets, or transmission and reception points (TRPs) that transmit PRS to the UE.

2. Description of Related Art

In a data communication network, such as a Fifth Generation New Radio (5G NR, also referred to herein as "NR", having requirements defined by the 3rd Generation Partnership Project (3GPP)), positioning techniques can be used to determine the location of a mobile electronic device (referred to herein as a UE)). The UE may use wireless radio frequency (RF) signaling between the UE and transmission and reception points (TRPs) (e.g., base stations) of the data communication network to perform measurements for positioning and/or communicate those measurements to the data communication network.

Different methods are available to perform positioning measurements. Some of the positioning methods are based on downlink signals and include downlink time difference of arrival (DL-TDOA) measurements and downlink angle of departure (DL-AoD) measurements. Other positioning methods are based on uplink signals and include uplink time difference of arrival (UL-TDOA) measurements and uplink angle of arrival (UL-AoA) measurements. Yet other positioning methods include measurements related to both downlink signals and uplink signals, such as round-trip time (RTT) with one or more neighboring base stations. In addition, each of the base stations can be associated with an identifier (ID) of a cell that is covered by the base station. Positioning of the UE can involve radio resource management (RRM) measurements that use enhanced cell identifiers (E-CID).

To help with the UE positioning, sounding reference signals (SRS) for positioning, also referred to positioning reference signals (PRS) in release 16 of the 3GPP specifications, are defined and enable the UE to detect and measure more neighboring base stations. For example, base stations send PRS to the UE to improve observed time of arrival (OTDOA) in DL-TDOA measurements. The OTDOA of the PRS from a reference cell station (e.g., the serving cell) and one or more neighboring cells is known as the downlink (DL) reference signal time difference (RSTD). Using the DL RSTD measurements, the absolute or relative transmission timing of each cell, and the known position(s) of base station transmitting antenna element(s) for the reference and neighboring cells, the UE's position may be determined.

Other SRS and PRS-based measurements are also possible. For example, downlink PRS can be used for downlink (DL) PRS reference signal received power (RSRP) measurements in support of DL-TDOA, DL-AoD, or multi-RTT. SRS for positioning can be used for UE reception-transmission (Rx-Tx) time different measurements in support of multi-RTT.

The UE positioning can also use measurements other than SRS and PRS-based ones. For example, synchronization signal block (SSB) and channel state information reference signal (CSI-RS) for radio resources management (RRM)-based measurements can be used in E-CID methods.

BRIEF SUMMARY

An example method for reporting measurement consistencies in support of positioning, according to this disclosure, comprises receiving positioning reference signal (PRS) resources and performing measurements based on the PRS resources. The method also comprises sending, to a device based on the performed measurements, information about a first consistency group that comprises a first set of elements, wherein: the first set of elements comprises a first number of elements equal to or less than a total number of: PRS measurements, PRS resources, PRS resources sets, transmission and reception points (TRPs), or frequency layers, or a combination thereof, with which the UE is configured. Each element in the first consistency group corresponds to: a PRS measurement, a PRS resource, a PRS resource set, a TRP, or a frequency layer, or a combination thereof. The first consistency group is associated with: a threshold, and a position estimate of the UE determined from at least a first subset of elements of the first consistency group for which an accuracy of the position estimate is estimated to be within the threshold.

An example user equipment (UE) for reporting measurement consistencies in support of positioning, according to this disclosure, comprises a transceiver, a memory, one or more processors communicatively coupled with the transceiver and the memory, wherein the one or more processors are configured to receive positioning reference signal (PRS) resources via the transceiver. The one or more processing units are further configured to perform measurements based on the PRS resources. The one or more processing units are further configured to send via the transceiver, to a device based on the performed measurements, information about a first consistency group that comprises a first set of elements, wherein: the first set of elements comprises a first number of elements equal to or less than a total number of: PRS measurements, PRS resources, PRS resources sets, transmission and reception points (TRPs), or frequency layers, or a combination thereof, with which the UE is configured. Each element in the first consistency group corresponds to: a PRS measurement, a PRS resource, a PRS resource set, a TRP, or a frequency layer, or a combination thereof. The first consistency group is associated with: a threshold, and a position estimate of the UE determined from at least a first subset of elements of the first consistency group for which an accuracy of the position estimate is estimated to be within the threshold.

An example apparatus for reporting measurement consistencies in support of positioning, according to this disclosure, comprises means for receiving positioning reference signal (PRS) resources, and means for performing measurements based on the PRS resources. The apparatus further comprises means for sending, to a device based on the performed measurements, information about a first consistency group that comprises a first set of elements, wherein: the first set of elements comprises a first number of elements equal to or less than a total number of: PRS measurements, PRS resources, PRS resources sets, transmission and reception points (TRPs), or frequency layers, or a combination thereof, with which a UE is configured. Each element in the first consistency group corresponds to: a PRS measurement, a PRS resource, a PRS resource set, a TRP, or a frequency layer, or a combination thereof. The first consistency group is associated with: a threshold, and a position estimate of the UE determined from at least a first subset of elements of the first consistency group for which an accuracy of the position estimate is estimated to be within the threshold.

According to this disclosure, an example non-transitory computer-readable medium stores instructions for reporting measurement consistencies in support of positioning, the instructions comprising code for receiving positioning reference signal (PRS) resources and performing measurements based on the PRS resources. The instructions further comprise code for sending, to a device based on the performed measurements, information about a first consistency group that comprises a first set of elements, wherein: the first set of elements comprises a first number of elements equal to or less than a total number of: PRS measurements, PRS resources, PRS resources sets, transmission and reception points (TRPs), or frequency layers, or a combination thereof, with which a UE is configured. Each element in the first consistency group corresponds to: a PRS measurement, a PRS resource, a PRS resource set, a TRP, or a frequency layer, or a combination thereof. The first consistency group is associated with: a threshold, and a position estimate of the UE determined from at least a first subset of elements of the first consistency group for which an accuracy of the position estimate is estimated to be within the threshold.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the disclosure are illustrated by way of example. In the accompanying figures, like reference numbers indicate similar elements.

Figure 1:
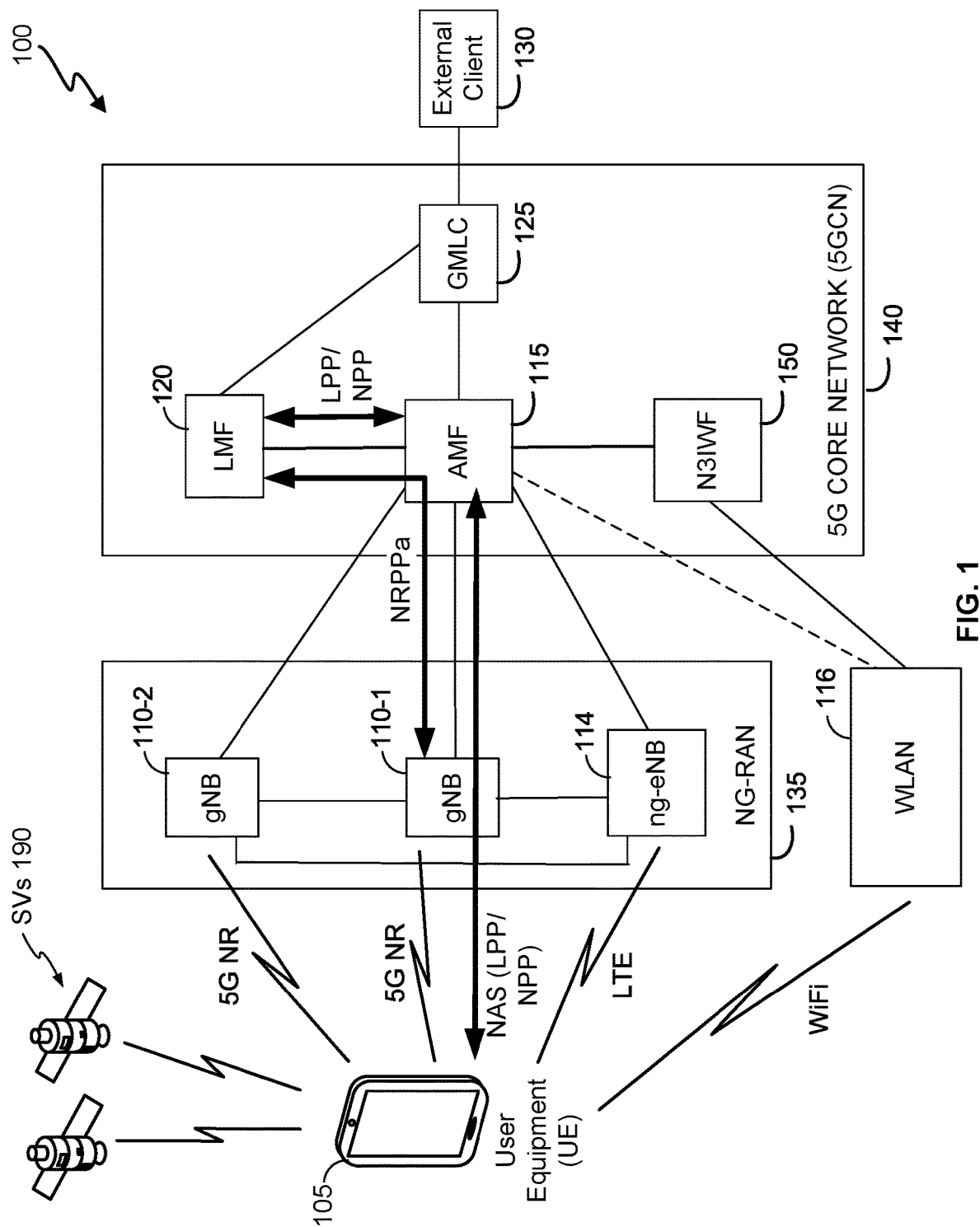
FIG. 1 illustrates an example of a diagram of a communication system, in accordance with at least one embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

Embodiments of the present disclosure are directed to, among other things, sending information about consistency groups by a UE to a device, such as a location server or another UE, in support of UE positioning. In an example, the UE receives reference signals, such as PRS, from TRPs and performs measurements on the reference signals in support of a positioning method. Due to different factors including, for instance, line-of-sight (LOS) and non-line-of-sight (NLOS) transmissions, signal-to-noise ratios (SNRs), and synchronization errors, measurement inconsistencies may occur at the reference signal measurements level, reference signal resources level, reference signal resource set level, TRP level, and/or frequency layers level. The UE positioning may be improved by detecting the measurement inconsistencies and relying instead on consistent measurements. To do so, the UE performs an outlier detection algorithm on the reference signal measurements at any of the above levels to determine one or more consistency groups for each of the applicable levels. The UE sends information about the consistency group(s) to the device, such as in one or more positioning measurement reports and/or in one or more separate reports. A consistency group generally includes a set of N elements for which reference signal measurements are consistent. Each one of the N elements corresponds to at least one of: a reference signal measurement, a reference signal resource, a reference signal resource set, a TRP, or a frequency layer.

In an example, the consistency of a consistency group is associated with a position estimate of the UE, where this position is determined from a subset of X elements of the N elements. The consistency is also associated with an estimate threshold. The UE position that is estimated using any subset or at least one subset of Y elements of the N elements is within the estimate threshold of the position estimate. Each of X, Y, and N is a positive integer, and X≤N and Y≤N.

In an additional or alternative example, the consistency of the consistency group is associated with the position estimate of the UE and with a measurement threshold. A measurement estimated for at least one or any of the N—X elements based on reference signal measurements associated with the X elements is within the measurement threshold of a reference measurement measured for the element.

To illustrate, consider an example of a UE receiving PRSs from ten TRPs during a positioning session with a location server. At the TRP level, the UE determines that eight of the ten TRPs belong to a consistency group, whereas the remaining two TRPs do not. In this case, the consistency group signifies the fact that, upon a determination of a UE position from measurements on PRSs sent from five of the eight TRPs, further estimating the UE position by additionally using any of the measurements on PRSs sent from the remaining three TRPs of the consistency group, would result in an error within an estimate threshold. In contrast, if any of the measurements on PRSs sent from the two TRPs outside of the consistency group was additionally used to further estimate the UE position, the estimated UE position would have an error larger than the estimate threshold.

As used herein, a PRS resource refers to a collection of resource elements (REs) inside a slot transmitted on a port (e.g., port 6) from a specific TRP. A resource element is the smallest transmission unit or part of a frame and contains a value representing data from a physical channel or signal. Receiving a PRS resources refers to the UE using configuration information about the allocation of PRS resources (including, for instance, slot number, OFDM symbol number) to process the corresponding collection of resource elements and determine PRS data contained in such a collection.

In the interest of clarity of explanation, embodiments of the present disclosure are described in connection with PRS-based positioning measurements. However, the embodiments are not limited as such and similarly apply to other types of reference signals and positioning measurements, including ones based on SRS for positioning, SSB for RRM, CSI-RS for RRM, and the like. In addition, the positioning measurements are performed during a positioning session in support of different positioning methods including, for instance, TDOA, AoD, and/or RTT. Herein also, the terms "location" and "position" are used interchangeably.

FIG. 1 illustrates an example of a diagram of a communication system 100, in accordance with at least one embodiment. The communication system 100 may be configured to determine the location of a UE 105 by using access nodes 110, 114, and 116, and/or a location server (LMF 120) to implement one or more positioning methods. Here, the communication system 100 comprises a UE 105, and components of a 5G network comprising a Next Generation (NG) Radio Access Network (RAN) (NG-RAN) 135 and a 5G Core Network (5GCN) 140. A 5G network may also be referred to as an NR network; NG-RAN 135 may be referred to as a 5G RAN or as an NR RAN; and 5GCN 140 may be referred to as an NG Core network. Standardization of an NG-RAN and 5GCN is ongoing in 3GPP. Accordingly, NG-RAN 135 and 5GCN 140 may conform to current or future standards for 5G support from 3GPP. The communication system 100 may further utilize information from space vehicles (SVs) 190 for a Global Navigation Satellite System (GNSS) like GPS, GLObal NAvigation Satellite System (GLONASS), Galileo or Beidou, or some other local or regional Satellite Positioning System (SPS) such as IRNSS, European Geostationary Navigation Overlay Service (EGNOS), or Wide Area Augmentation System (WAAS). Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, WLANs 116, Access and Mobility Functions (AMF)s 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more radio access technologies (RATs) such as using Global System for Mobile Communications (GSM), Code Division Multiple Access (CDMA), Wideband CDMA (WCDMA), LTE, High Rate Packet Data (HRPD), IEEE 802.11 Wi-Fi (also referred to as Wi-Fi), Bluetooth (BT), Worldwide Interoperability for Microwave Access (WiMAX), 5G New Radio (NR) (e.g., using the NG-RAN 135 and 5GCN 140), etc. The UE 105 may also support wireless communication using a WLAN 116 which may connect to other networks (e.g., the Internet). The use of one or more of these RATs may allow the UE 105 to communicate with an external client 130 (e.g., via elements of 5GCN 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan, or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude and altitude above or below mean sea level).

Base stations (BSs) in the NG-RAN 135 shown in FIG. 1 may comprise a Transmission Reception Point (TRP), such as a NR NodeB (gNB) and/or an antenna of the gNB comprise gNBs, 110-1 and 110-2 (collectively and generically referred to herein as gNBs 110). Pairs of gNBs 110 in NG-RAN 135 may be connected to one another—e.g., directly as shown in FIG. 1 or indirectly via other gNBs 110. Access to the 5G network is provided to UE 105 via wireless communication between the UE 105 and one or more of the gNBs 110, which may provide wireless communications access to the 5GCN 140 on behalf of the UE 105 using 5G NR. 5G NR radio access may also be referred to as NR radio access or as 5G radio access. In FIG. 1, the serving gNB for UE 105 is assumed to be gNB 110-1, although other gNBs (e.g., gNB 110-2) may act as a serving gNB if UE 105 moves to another location or may act as a secondary gNB to provide additional throughout and bandwidth to UE 105.

BSs in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g., directly or indirectly via other gNBs 110 and/or other ng-eNBs. An ng-eNB 114 may provide LTE wireless access and/or evolved LTE (eLTE) wireless access to UE 105.

Some gNBs 110 (e.g., gNB 110-2) and/or ng-eNB 114 in FIG. 1 may be configured to function as positioning-only beacons which may transmit signals (e.g., Positioning Reference Signals ("PRS signals")) and/or may broadcast assistance data to assist positioning of UE 105 but may not receive signals from UE 105 or from other UEs. It is noted that while only one ng-eNB 114 is shown in FIG. 1, some embodiments may include multiple ng-eNBs 114.

Communication system 100 may also include one or more WLANs 116 which may connect to a Non-3GPP InterWorking Function (N3IWF) 150 in the 5GCN 140 (e.g., in the case of an untrusted WLAN 116). For example, the WLAN 116 may support IEEE 802.11 Wi-Fi access for UE 105 and may comprise one or more Wi-Fi access points (APs). Here, the N3IWF 150 may connect to other elements in the 5GCN 140 such as AMF 115. In some embodiments, WLAN 116 may support another RAT such as Bluetooth. The N3IWF 150 may provide support for secure access by UE 105 to other elements in 5GCN 140 and/or may support interworking of one or more protocols used by WLAN 116 and UE 105 to one or more protocols used by other elements of 5GCN 140 such as AMF 115. For example, N3IWF 150 may support IPsec tunnel establishment with UE 105, termination of IKEv2/IPsec protocols with UE 105, termination of N2 and N3 interfaces to 5GCN 140 for control plane (CP) and user plane (UP), respectively, relaying of uplink (UL) and downlink (DL) CP Non-Access Stratum (NAS) signaling between UE 105 and AMF 115 across an N1 interface. In some other embodiments, WLAN 116 may connect directly to elements in 5GCN 140 (e.g., AMF 115 as shown by the dashed line in FIG. 1) and not via N3IWF 150. For example, direct connection of WLAN 116 to 5GCN 140 may occur if WLAN 116 is a trusted WLAN for 5GCN 140 and may be enabled using a Trusted WLAN Interworking Function (TWIF) (not shown in FIG. 1) which may be an element inside WLAN 116. It is noted that while only one WLAN 116 is shown in FIG. 1, some embodiments may include multiple WLANs 116.

Access nodes may comprise any of a variety of network entities enabling communication between the UE 105 and the AMF 115. This can include gNBs 110, ng-eNB 114, WLAN 116, and/or other types of cellular base stations. However, access nodes providing the functionality described herein may additionally or alternatively include entities enabling communications to any of a variety of RATs not illustrated in FIG. 1, which may include non-cellular technologies. Thus, the term "access node," as used in the embodiments described herein below, may include but is not necessarily limited to a gNB 110, ng-eNB 114 or WLAN 116.

In some embodiments, an access node, such as a gNB 110, ng-eNB 114, or WLAN 116 (alone or in combination with other components of the communication system 100), may be configured to, in response to receiving a request for location information from the LMF 120, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 1 depicts access nodes 110, 114, and 116 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 135 and the EPC corresponds to 5GCN 140 in FIG. 1. The methods and techniques described herein for obtaining a civic location for UE 105 may be applicable to such other networks.

The gNBs 110 and ng-eNB 114 can communicate with an AMF 115, which, for positioning functionality, communicates with an LMF 120. The AMF 115 may support mobility of the UE 105, including cell change and handover of UE 105 from an access node 110, 114, or 116 of a first RAT to an access node 110, 114, or 116 of a second RAT. The AMF 115 may also participate in supporting a signaling connection to the UE 105 and possibly data and voice bearers for the UE 105. The LMF 120 may support positioning of the UE 105 using a CP location solution when UE 105 accesses the NG-RAN 135 or WLAN 116 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AOA), angle of departure (AoD), WLAN positioning, round trip signal propagation delay (RTT), multi-cell RTT, and/or other positioning procedures and methods. The LMF 120 may also process location service requests for the UE 105, e.g., received from the AMF 115 or from the GMLC 125. The LMF 120 may be connected to AMF 115 and/or to GMLC 125. In some embodiments, a network such as 5GCN 140 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 110, ng-eNB 114 and/or WLAN 116, and/or using assistance data provided to the UE 105, e.g., by LMF 120).

The Gateway Mobile Location Center (GMLC) 125 may support a location request for the UE 105 received from an external client 130 and may forward such a location request to the AMF 115 for forwarding by the AMF 115 to the LMF 120, or may forward the location request directly to the LMF 120. A location response from the LMF 120 (e.g., containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5GCN 140 in some implementations.

As further illustrated in FIG. 1, the LMF 120 may communicate with the gNBs 110 and/or with the ng-eNB 114 using an NR Positioning Protocol annex (NRPPa) as defined in 3GPP Technical Specification (TS) 38.445. NRPPa messages may be transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP) as defined in 3GPP TS 37.355. Here, LPP messages may be transferred between the UE 105 and the LMF 120 via the AMF 115 and a serving gNB 110-1 or serving ng-eNB 114 for UE 105. For example, LPP messages may be transferred between the LMF 120 and the AMF 115 using messages for service-based operations (e.g., based on the Hypertext Transfer Protocol (HTTP)) and may be transferred between the AMF 115 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AOA, uplink TDOA (UL-TDOA) and/or may be used by LMF 120 to obtain location related information from gNBs 110 and/or ng-eNB 114, such as parameters defining DL-PRS transmission from gNBs 110 and/or ng-eNB 114.

In the case of UE 105 access to WLAN 116, LMF 120 may use NRPPa and/or LPP to obtain a location of UE 105 in a similar manner to that just described for UE 105 access to a gNB 110 or ng-eNB 114. Thus, NRPPa messages may be transferred between a WLAN 116 and the LMF 120, via the AMF 115 and N3IWF 150 to support network-based positioning of UE 105 and/or transfer of other location information from WLAN 116 to LMF 120. Alternatively, NRPPa messages may be transferred between N3IWF 150 and the LMF 120, via the AMF 115, to support network-based positioning of UE 105 based on location related information and/or location measurements known to or accessible to N3IWF 150 and transferred from N3IWF 150 to LMF 120 using NRPPa. Similarly, LPP and/or LPP messages may be transferred between the UE 105 and the LMF 120 via the AMF 115, N3IWF 150, and serving WLAN 116 for UE 105 to support UE assisted or UE based positioning of UE 105 by LMF 120.

In a 5G NR positioning system 100, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 130, LMF 120, or other device or service within the 5G network, the positioning method may be categorized as being UE assisted (or "network-based").

With a UE-assisted position method, UE 105 may obtain location measurements and send the measurements to a location server (e.g., LMF 120) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AoD, or Timing Advance (TA) for gNBs 110, ng-eNB 114, and/or one or more access points for WLAN 116. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 120, an SLP, or broadcast by gNBs 110, ng-eNB 114, or WLAN 116).

With a network based position method, one or more base stations (e.g., gNBs 110 and/or ng-eNB 114), one or more APs (e.g., in WLAN 116), or N3IWF 150 may obtain location measurements (e.g., measurements of RSSI, RTT, RSRP, RSRQ, AOA, or TOA) for signals transmitted by UE 105, and/or may receive measurements obtained by UE 105 or by an AP in WLAN 116 in the case of N3IWF 150, and may send the measurements to a location server (e.g., LMF 120) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AOA.

Figure 2:
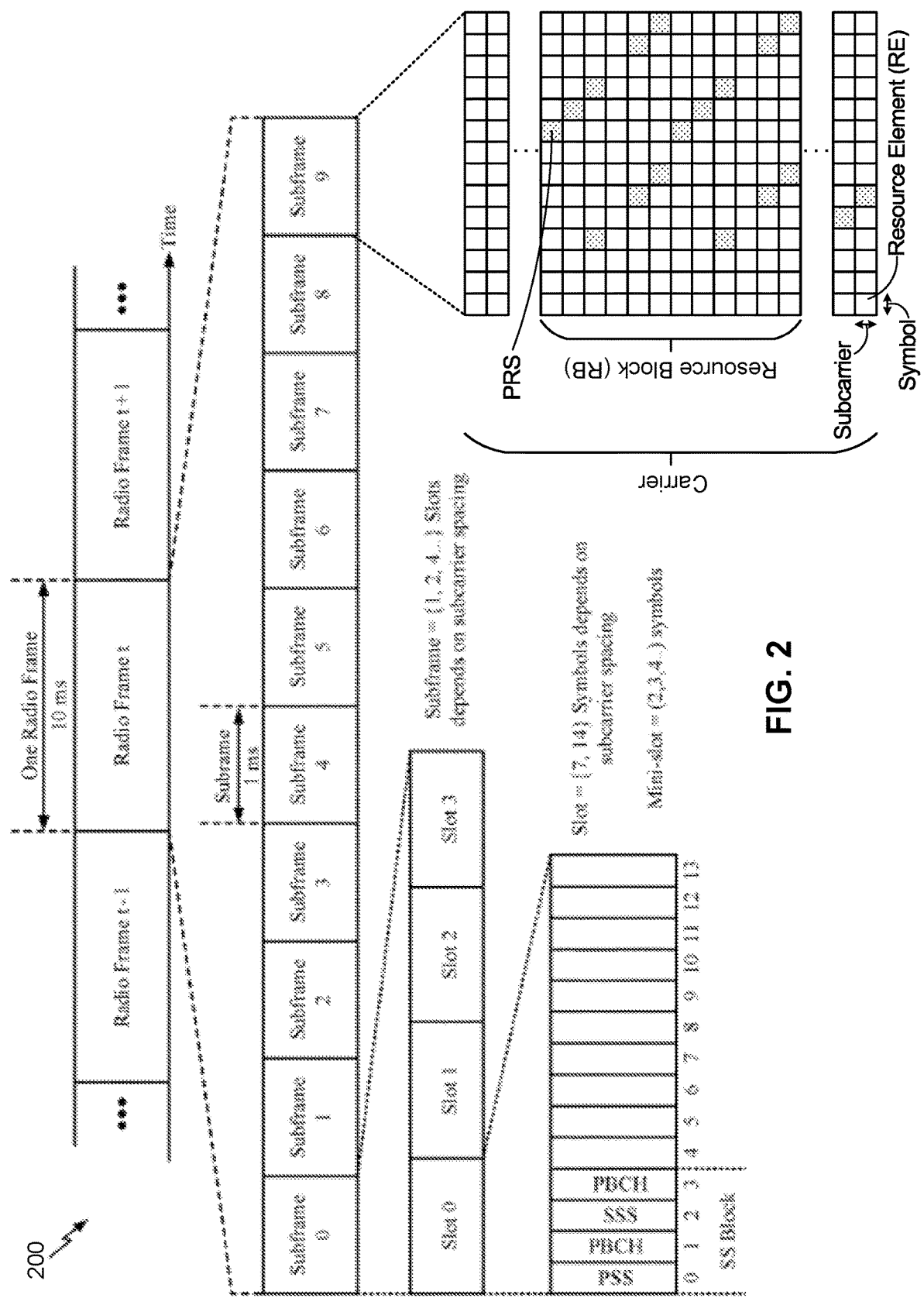
FIG. 2 illustrates an example of a frame structure usable by a communication system, in accordance with at least one embodiment.

FIG. 2 illustrates an example of a frame structure 200 usable by a communication system, such as the communication system 100, in accordance with at least one embodiment. The frame structure 200 can serve as the basis for physical layer communication between the UE 105 and serving gNB 110-1. The transmission timeline for each of the downlink and uplink may be partitioned into units of radio frames. Each radio frame may have a predetermined duration (e.g., ten milliseconds (ms)) and may be partitioned into ten subframes, each of one ms, with indices of "0" through "9." Each subframe may include a variable number of slots depending on the subcarrier spacing. Each slot may include a variable number of symbol periods (e.g., seven or fourteen symbols) depending on the subcarrier spacing. The symbol periods in each slot may be assigned indices. A mini-slot may comprise a sub slot structure (e.g., two, three, or four symbols). Additionally shown in FIG. 2 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning fourteen symbols and twelve subcarriers. Each RE is represented in FIG. 2 with a square. Dotted squares represent PRS REs (e.g., REs allocated for PRS, also referred to herein as PRS resources). In the illustration of FIG. 2, the PRS allocation follows a diagonal pattern, where the symbols for PRS are arranged diagonally and are six subcarriers apart in the frequency domain.

Each symbol in a slot may indicate a link direction (e.g., DL, UL, or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols "0-3" as shown in FIG. 2. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

For a given frequency, the serving gNB 110-1 may configure the UE 105 by performing, among other things, Time Domain Division (TDD) resource designation using different layers to perform different functions. An "upper layer" or "higher layer" may comprise a layer of the serving base station 110-1 providing control information to the UE 105 via Radio Resource Control (RRC) protocol (e.g., an RRC layer). A higher layer may additionally include an application layer, Media Access Control (MAC) layer, or other layer capable of providing the UE 105 with information regarding designated resources for communications. Furthermore, the physical layer (or "lower layer") has a scheduler that can provide Downlink Control Information (DCI) information (e.g., transport format, resource allocation, etc.) to the UE 105 via the Physical Downlink Control Channel (PDCCH). The serving gNB 110-1 can, using RRC signaling, perform semi-static designation of time domain resource elements to implement cell-specific and/or UE-specific patterns. The physical layer, the serving gNB 110-1 can (using DCI in the PDCCH) perform a dynamic designation of time domain resources on a per-slot basis (e.g., having much finer granularity than RRC signaling) using a Slot Format Indicator (SFI) in the DCI.

The PUCCH is used to communicate Uplink Control Information (UCI) from the UE to the serving gNB 110-1. This UCI may comprise, for example, a Hybrid Automatic Repeat Request (HARQ) (e.g., a HARQ Acknowledgement (HARQ-ACK)), Channel State Information (CSI), and Scheduling Request (SR). In NR, PUCCH may be flexible in its time and frequency allocation, allowing for differently-capable UEs (e.g., UEs with smaller bandwidth capabilities) efficient usage of available resources. For NR, PUCCH resources can come in five different formats, including short formats (in which PUCCH resources span "1-2" symbols), and long formats (in which PUCCH resources can span "4-14" symbols).

Figure 3:
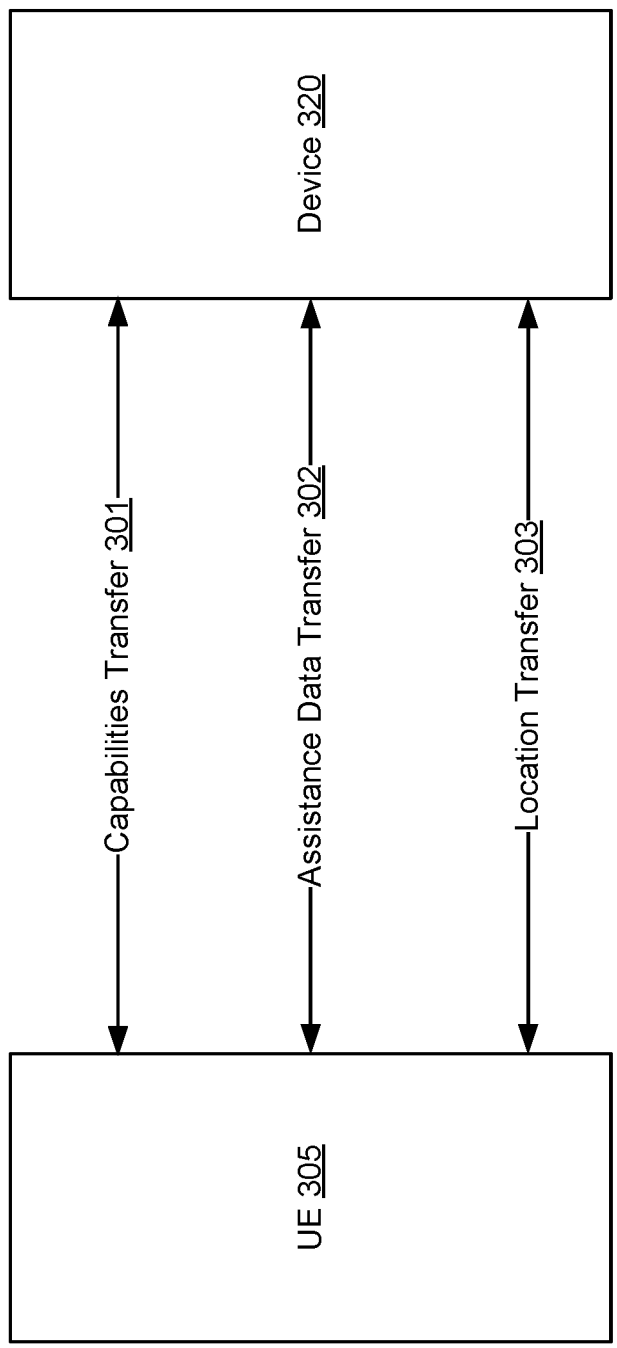
FIG. 3 illustrates an example of communications procedures in a positioning session, in accordance with at least one embodiment.

FIG. 3 illustrates an example of communications procedures in a positioning session, in accordance with at least one embodiment. The positioning session is between a UE 305 and a device 320. The UE 305 can correspond to the UE 105. The device 320 can be a location server (e.g., LMF 120), where the location server can be a standalone component of a communication system (e.g., the communication system 100) or can be integrated with another component of the communication system (e.g., with a base station). The positioning session follows a particular protocol, such as the LPP protocol for an LPP session, and remains established to allow communications between the UE 305 and the device 320 according to the particular protocol. During the positioning session, information is exchanged between the UE 305 and the device 320 to enable UE positioning. The information can define parameters for positioning measurements in support of a positioning method. The UE 305 can perform the positioning measurements on PRS sent from one or more TRPs and corresponding to PRS resources and resource sets. The UE 305 can also report the positioning measurements to the device 320 and/or estimate the position of the UE 305 and report this position to the device 320. In particular, the UE 305 can report location information, where the location information includes the positioning measurements and/or the position estimate.

As illustrated, at the start of the positioning session, the device 320 may not be aware of the capabilities of the UE 305 to perform positioning measurements. Accordingly, a capability indication procedure is performed to send information about the capabilities to the device 320 (illustrated as a capabilities transfer 301). Further, assistance data may be sent from the device 320 to the UE 305 (illustrated as an assistance data transfer 302), according to an assistance data procedure. The UE 305 may rely on the assistance data to perform particular positioning measurements. Data related to the positioning measurements (e.g., the actual measurements or a position estimate derived therefrom) may be sent to the UE 305 (illustrated as a location transfer 303) according to a location transfer procedure. Each of the transfers can include an exchange of one or more messages, each message requesting information and providing information.

In an example specific to OTDOA, as part of the capabilities transfer 301, the device 320 sends a "request capabilities" message to the UE 305, where this message indicates the type of capabilities needed. For OTDOA, this message includes the OTDOA-RequestCapabilities information element (IE), indicating that the UE's 305 OTDOA capabilities are requested. In response, the UE 305 sends a "provide capabilities" message to the device 320. This response message includes OTDOA mode supported, supported frequency bands, support for inter-frequency RSTD measurements, and other information related to the capabilities of the UE 305 to support an OTDOA positioning method.

As part of the assistance data transfer 302, the device 320 sends a "provide assistance data" message to the UE 305, where this message contains, for instance, OTDOA assistance data. The OTDOA assistance data includes an assistance data reference cell, assistance for a number of neighboring cells, PRS configurations (including PRS resources and PRS resource sets), and other information related to assisting the UE 305 with performing positioning measurements.

As part of the location transfer 303, the device 320 sends a "request location information" message to the UE 305 to request, for instance, RSTD measurements. This message can include location information type, desired accuracy, response time, whether periodic reporting is requested, environmental characterization (including expected multipath and NLOS), and other information related to performing the positioning measurements. The UE 305 performs, for instance, RSTD measurements using the provided assistance data. When the response time indicated by the "request location" information message expires, the UE 305 provides the RTSD measurements in a "provide location information" message to the device 320.

In the above example, the following information can be reported in the "provide location information message":

```
NR-DL-TDOA-SignalMeasurementInformation-r16 ::= SEQUENCE {
    dl-PRS-ReferenceInfo-r16              DL-PRS-IdInfo-r16,
    nr-DL-TDOA-MeasList-r16               NR-DL-TDOA-MeasList-r16,
    ...
}
NR-DL-TDOA-MeasList-r16 ::= SEQUENCE (SIZE(1..nrMaxTRPs-r16)) OF NR-DL-
TDOA-MeasElement-r16
NR-DL-TDOA-MeasElement-r16 ::= SEQUENCE {
    trp-ID-r16                            TRP-ID-r16,
    nr-DL-PRS-ResourceId-r16              NR-DL-PRS-ResourceId-r16        OPTIONAL,
    nr-DL-PRS-ResourceSetId-r16             NR-DL-PRS-ResourceSetId-r16   OPTIONAL,
    nr-TimeStamp-r16                      NR-TimeStamp-r16,
    nr-RSTD-r16                           INTEGER (0..ffs),               -- FFS on the value range
    nr-AdditionalPathList-r16             NR-AdditionalPathList-r16       OPTIONAL,
    nr-TimingMeasQuality-r16              NR-TimingMeasQuality-r16,
    nr-PRS-RSRP-Result-r16                INTEGER (FFS)                   OPTIONAL,
    -- FFS, value range to be decided in RAN4.
    nr-DL-TDOA-AdditionalMeasurements-r16
    NR-DL-TDOA-AdditionalMeasurements-r16                                 OPTIONAL,
        ...
}
```

As shown, the above reported information includes an identifier (or identity—ID) of the reference cell used for the RTSD measurements, quality of the TOA measurements from the reference cell (e.g., a TRP ID), neighbor cell measurement list including an identifier of a measured neighboring cell (e.g., a TRP ID), the related RSTD measurement and its quality, the identity of the PRS resource, an identifier of the PRS resource set, and other information related to the measurements. As further described herein below, this message can be augmented to also identify one or more consistency groups. A consistency group can be applicable to an area that contains the UE 305 and UEs in vicinity thereof.

In the above information, a TRP identifier can include an integer that identifies the TRP locally to the UE 305, in addition to a physical cell identifier and a cell global identifier that identify the TRP to various UEs. An example of the TRP identifier is shown below:

```
-- ASN1START
TRP-ID-r16 ::= SEQUENCE {
    dl-PRS-ID-r16          INTEGER (0..255)       OPTIONAL,
    nr-Phys-CellId-r16     NR-PhysCellId-r16      OPTIONAL,
    nr-CellGlobalId-r16    NCGI-r15               OPTIONAL, -- Need ON
    nrARFCNRef-r16         ARFCN-ValueNR-r15      OPTIONAL, --
    Cond NotSameAsRefServ0
    ...
}
-- ASN1STOP
```

In addition, the above-reported information includes the timestamp of the measurement. The timestamp can be used to determine an absolute time for tracking. In particular, the absolute time can be used to track a consistency group determined by the UE 305 over time. In this way, the consistency group can be applicable to not only the area that contains the UE 305 and UEs in vicinity thereof, but also to a time period. In other words, the consistency group can be usable for a UE in "area A" between times "t1" and "t2" but may not be usable in "area B" or no longer be usable in "area A" after time "t2." For instance, the reported timestamp includes fields related to the slot, subframe, and frame number for which a measurement is valid as well as an identifier of a TRP, as shown below:

```
-- ASN1START
NR-TimeStamp-r16 ::= SEQUENCE {
    trp-ID-r16      TRP-ID-r16          OPTIONAL,    -- Cond NotSameAsRefServ0
    nr-SFN-r16      INTEGER (0..1023),
    nr-Slot-r16     CHOICE {
        scs15-r16       INTEGER (0..9),
        scs30-r16       INTEGER (0..19),
        scs60-r16       INTEGER (0..39),
        scs120-r16      INTEGER (0..79)
    },
    ...
}
-- ASN1STOP
```

The above example of reported information is provided for illustrative purposes. Other information can be included in the "provide location measurement" message depending on the positioning method, such as information related to Rx-Tx time difference measurements in support of RTT or information related to RSRP measurements for AoD.

Figure 4:
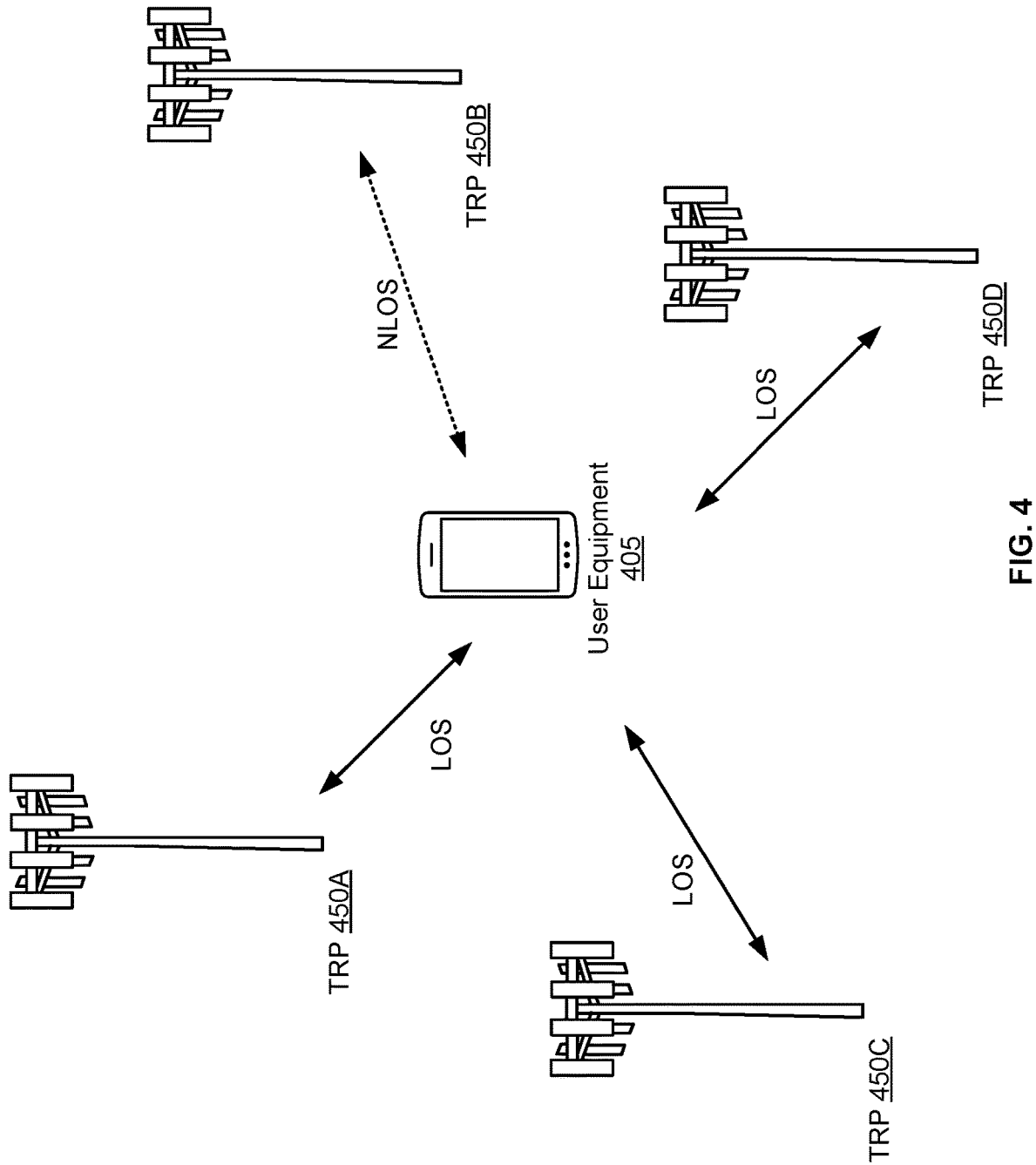
FIG. 4 illustrates an example of a UE receiving PRS from multiple TRPs, in accordance with at least one embodiment.

FIG. 4 illustrates an example of a UE 405 receiving PRS from multiple TRPs 450, in accordance with at least one embodiment. The UE 405 is an example of the UE 305 of FIG. 3. Each one of the TRPs 450 is an example of a gNB 110, ng-eNB 114, and/or WLAN's 116 AP. For purpose of illustration, four TRPs are shown in FIG. 4 and are labeled 450A, 450B, 450C, and 450D (collectively referred to as TRPs 450), although a different number of TRPs is possible.

The UE 405 can receive PRS in one or more multiple frequency layers. Each frequency layer can include PRS sent from one or more TRPs. A PRS can be received from a TRP in PRS resources within one or more PRS resource sets. In particular, a TRP can support multiple frequency layers (e.g., four). A frequency layer represents a collection of PRS resource sets across TRPs at a same bandwidth, carrier spacing, and cyclic prefix. Within each frequency layer, multiple PRS resource sets can be configured per TRP.

Further, within each PRS resource set, there can be multiple PRS resources. Each of the PRS resources, PRS resource sets, TRPs, and frequency layers can have an identifier such that the measurements performed on the PRS can be tracked per PRS resource, PRS resource set, TRP, and frequency layer. As explained herein above, the tracking can be also performed over time using timestamps.

Depending on several conditions, including environmental conditions, some of the PRS can be transmitted using an LOS transmission, while other PRS can be transmitted using an NLOS transmission. In the illustration of FIG. 4, LOS transmissions exist between the UE 405 and each of TRP 450A, 450C, and 450D. NLOS transmissions exist between the UE 405 and the TRP 450B. The type of transmissions (e.g., LOS and NLOS) can impact the accuracy (e.g., measurement error) when performing PRS measurements and deriving a position estimate. In particular, measurements on PRS received using LOS transmissions can provide consistent measurement accuracy resulting in a position estimate at a desired estimation error. In comparison, measurement on PRS received using NLOS transmission can provide a different measurement accuracy by, for instance, degrading the measurement accuracy.

The capability of detecting and distinguishing between LOS transmissions and NLOS transmissions can improve the UE positioning. For instance, by using only the measurements on PRS received using LOS transmissions, the estimate of the UE's 405 position can become more accurate. LOS and NLOS transmissions are factors that may impact the accuracy. However, other factors are possible, such as SNR (e.g., when the SNR decreases, the accuracy also decreases) or synchronization error (e.g., an error in the synchronization of the timing of transmission of SRS by a TRP and the timing of reception of the SRS by the UE; when the error increases, the accuracy decreases).

Herein, the UE can determine one or more consistency groups. A consistency group includes elements that would result in consistent PRS measurements and/or position estimates (e.g., within desired accuracies), where one or more factors may have contributed to the consistency (e.g., LOS transmission, high SNR, low synchronization error). The elements can be defined at a level of a PRS measurement, a PRS resource, a PRS resource set, a TRP, and/or a frequency layer. In a way, the consistency group indicates that the elements would produce consistent PRS measurements and/or position estimate because of LOS transmissions, high SNRs, and/or low synchronization errors, and so on that correspond to these elements.

The UE 405 can report information about consistency group(s) that it determines to a location server. In this way, the location server may only consider PRS measurements corresponding to the elements of a reported consistency group to determine a position of the UE 405.

In addition, a consistency group can be valid for an area that contains the UE 405 and, within which, PRS can be received from the TRPs 450 according to similar factors. The area can be a few feet or yards around the UE 405. In this way, if the UE remains in the area or another UE is in vicinity of the UE 405, it can be expected that the consistency group determined by the UE 405 (at the TRP and/or frequency layer levels) can be also valid and applicable to the UE 405 and the other UE. The UE 405 can share its determined consistency group(s) with the nearby UEs directly (e.g., via a sidelink such as in Physical Sidelink Shared Channel (PSSCH)) or indirectly (e.g., via the location server), and these UEs may only consider the elements in the consistency group(s) in their PRS measurements and/or position estimates.

Of course, the factors that contributed to a consistency group can change over time depending on changes to the conditions. For instance, whereas LOS transmissions are possible between the TRP 450A and the UE 405 during a first time period, such types of transmissions may not be possible in a second time period. Instead, during the second time period, NLOS transmissions may become possible. Given this possible change over time, time-based tracking of consistency groups can be beneficial. In particular, a consistency group may be valid during a time period after which it may no longer be usable. In this way, if the UE remains in the area but some of the conditions change after some time, a new consistency group may be determined and used.

Figure 5:
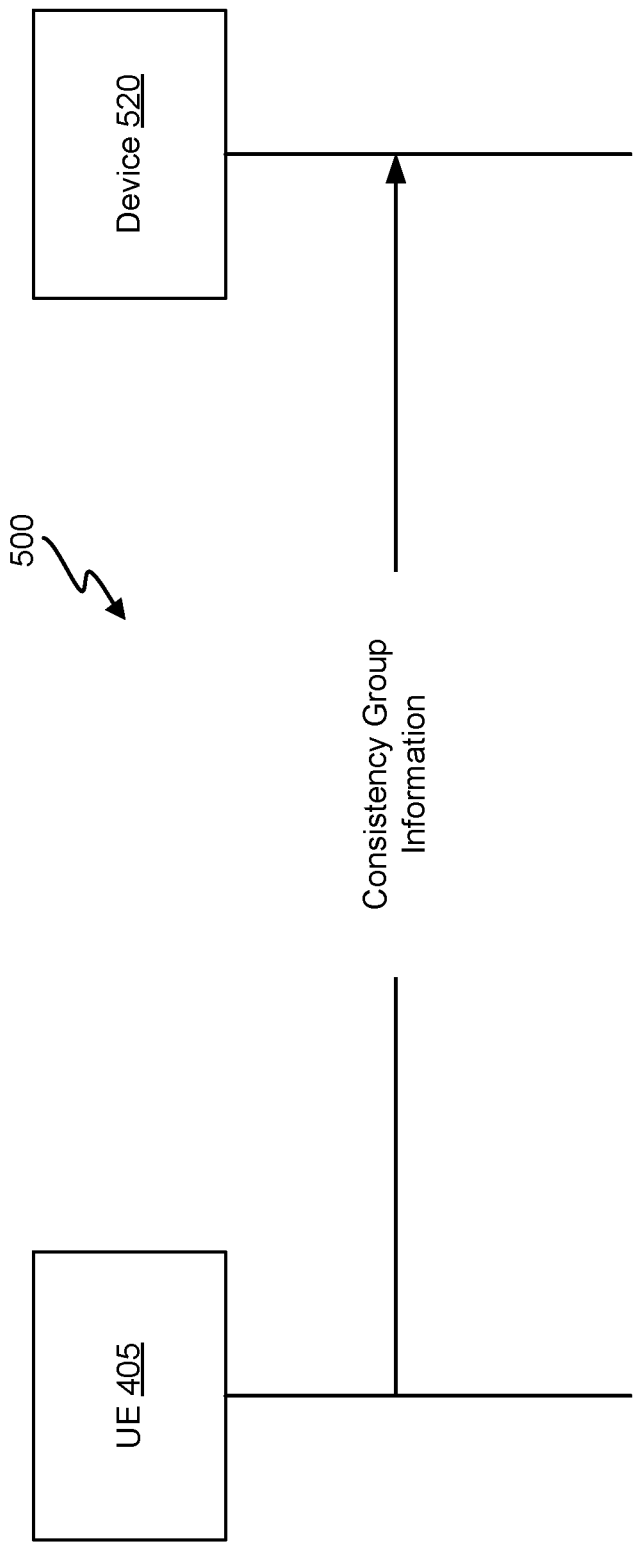
FIG. 5 illustrates an example of a UE reporting information about consistency groups, in accordance with at least one embodiment.

FIG. 5 illustrates an example of the UE 405 reporting information about consistency groups, in accordance with at least one embodiment. The UE 405 may correspond to the UE 305 of FIG. 3 and/or UE 105 of FIG. 1, for example. The UE 405 may send this information to a device 520, such as the device 320 (e.g., a location server with which a position session may have been established and is ongoing) or a different UE (e.g., another UE that is in vicinity of the UE 405 and with which a sidelink may be established). If the device 520 comprises a location server, the consistency group information may be sent, for example, in an LPP message.

Generally, a consistency group includes elements that provide consistent measurements and/or result in consistent position estimates. For example, consistency can be defined in terms of accuracy. In particular, measurements are consistent when they have similar measurement errors (e.g., are within a measurement threshold of each other). Position estimates are consistent when they have similar estimate errors (e.g., are within an estimate threshold of each other).

Different definitions of a consistency group are possible, all of which would set rules or parameters for determining whether an element belongs to the consistency group or not. In one example, a consistency group corresponds to or includes a collection or a set of N elements that result in positioning measurements (e.g., RSTD, RSRP, Rx-Tx time difference), such that using any X<N measurements from a subset of the consistency group would result in a position estimate, which if used to estimate measurements of the remaining N—X elements of the group, the median, maximum, or average error is within a K threshold.

For instance, RSTD measurements may be used for a TDOA positioning method. The RSTD measurements include TOA measurements. In this illustration, N is ten, X is four, and K is less than a couple of nanoseconds. The consistency group include the ten elements, where using any four TOA measurements corresponding to any four of the ten elements would result in a position estimate of the UE 405. Given that position estimate, the TOA for each of the remaining six elements can be estimated (also given known locations of the corresponding TRP). For each of the six remaining elements, the difference between the estimated TOA measurement and the TOA measurement corresponding to the element is less than a couple of nanoseconds (e.g., less than the K threshold).

In another example definition, a consistency group corresponds to or includes a collection or a set of N elements, for which the corresponding elements result in a position estimate having an expected error that is less than a K threshold, where if any of such N elements is removed from the consistency group and/or if any new element is added to the consistency group, the expected error becomes larger than the threshold.

For instance, and referring back to the RSTD measurements, N is also ten and the K threshold is a couple of feet. In this illustration, the measurements corresponding to the ten elements result in a position estimate with an expected error that is less than a couple of feet (e.g., the K threshold). If one or more of these ten elements are removed from the group, the measurements corresponding to the remaining elements result in a position estimate with an expected error that is larger than a couple of feet. Likewise, if one or more other elements are added to the consistency group, the measurements corresponding to the different elements of the consistency group result in a position estimate with an expected error that is larger than a couple of feet.

In yet another example definition, a consistency group corresponds to or includes a collection or a set of N elements and is associated with (i) a position estimate of the UE 405 determined from a subset of X elements of the N elements and (ii) an estimate threshold or a measurement threshold, where a UE position that is estimated using any subset or at least one subset of Y elements of the N elements is within the estimate threshold of the position estimate, or where a measurement estimated for any or at least one of the N—X elements based on measurements associated with the X elements is within the measurement threshold of a measurement measured for the element. Each of X, Y, and N is a positive integer, and X≤N and Y≤N.

For instance, and referring back to the RSTD measurements, N is ten, X is four, the estimate threshold is a couple of feet, and the measurement threshold is a couple of seconds. A baseline position of the UE 405 is determined from measurements corresponding to the group of X elements. For a Y equal to five (or any other Y between four and ten), a position of the UE 405 is estimated from measurements corresponding to the five elements. The difference between this estimated position and the baseline position is less than a couple of feet (e.g., the estimate threshold). Or, from the baseline position 405, a TOA can be estimated for each one of the N—X (e.g., six elements). For each one of these six elements, the difference between the estimated TOA and the TOA measurement corresponding to the element is less than a couple of nanoseconds (e.g., the measurement threshold).

In a further example definition, the consistency group is a set N that includes n≤p elements, where p is a total number of at least one of: PRS measurements, PRS resources, PRS resources sets, TRPs, or frequency layers with which the UE 405 is configured. The consistency group is associated with: (i) a threshold, (ii) a position estimate of the UE determined from at least one subset X of the consistency group with x≤p elements for which an accuracy of the position estimate is estimated to be below the threshold, and (iii) existence of a set Y of y elements not strictly contained (e.g., Y∩N≠Y) in the consistency group for which the position estimate using at least one subset of the set Y is estimated to be above the threshold.

For instance, and referring back to the RSTD measurements, p is twenty, N is ten, X is four, and the threshold is a couple of feet. A baseline position of the UE 405 is determined from measurements corresponding to a subset of four elements and this baseline position is less than a couple of feet. For a Y equal to five (or any other Y not strictly contained in the set of ten), a position of the UE 405 that is estimated from a subset of the five elements is estimated to be larger than a couple of feet.

The elements can be defined at a level of a PRS measurement, PRS resource, PRS resource set, TRP, and/or frequency layer, where the elements meet any or a particular one of the above definitions. In particular, at a PRS measurement level, a consistency group can include PRS measurements that are consistent, where these elements. At a PRS resource level, a consistency group can include PRS resources that are consistent. At a PRS resource set level, a consistency group can include one or more PRS resource sets that are consistent. At a TRP level, a consistency group can include one or more TRPs that are consistent. At a frequency layer level, a consistency group can include one or more frequency layers that are consistent. Here, including an element refers to including the actual element as possible (e.g., including the PRS measurements) or including an identifier of the element (e.g., IDs of PRS measurements, PRS resources, PRS resource sets, TRPs, and/or frequency layers).

In addition, for a same level, it may be sufficient to define one consistency group, whereby some elements belong to the consistency group and remaining elements do not. However, multiple consistency groups may be defined, too, whereby each of the consistency groups can, but need not, have at least one different parameter (e.g., a different number of elements, a different subset size X, a different measurement threshold, a different estimate threshold, or some other parameters). For instance, at a TRP level, multiple consistency groups may be defined. One consistency group may correspond to TRPs that result in a position estimate with an expected error of less than two feet, another consistency group may correspond to TRPs that result in a position estimate with an expected error between two feet and five feet, and so on and so forth.

Generally, the UE 405 may perform an outlier detection algorithm, such as a random sampling and consensus (RANSAC) algorithm, to determine the consistency group(s), and may report the information about the determined consistency group(s). The outlier detection algorithm may be executed according to a definition of the elements (e.g., whether the elements should be PRS measurements, PRS resources, PRS resource sets, TRPs, and/or frequency layers), a definition of the consistency group (e.g., the number N of elements, the subset size X, and/or the threshold (e.g., estimate threshold or measurement threshold)), and a desired number of consistency groups. For instance, at a TRP level, and to generate a consistency group of ten elements with a subset X of four and a K threshold (e.g., a measurement threshold) of less than a couple of nanoseconds, the outlier detection algorithm may analyze the different PRS measurements and their associations with TRP IDs and iteratively construct the consistency group to meet the subset X and K threshold parameters for the ten TRPs of the consistency group.

The definitions of the elements (e.g., whether the elements should be PRS measurements, PRS resources, PRS resource sets, TRPs, and/or frequency layers), the parameters of the consistency groups (e.g., the number N of elements, the subset size X, and/or the threshold (e.g., estimate threshold or measurement threshold)), and the number of the consistency groups to determine can be configured by the device 320 (e.g., when the device 320 is a location server). Additionally or alternatively, such configuration can be preset and stored locally at the UE 405 and/or can be recommended by the UE 405 to the location server.

The UE 405 may report consistency groups for each positioning measurement report (e.g., TDOA, RTT, AoD). For instance, information about the consistency groups (e.g., the identifier(s) of element(s) included in the consistency group) can be included in the other information (e.g., the IE) of the positioning measurement reports. Referring to the consistency group definitions, the subset size X (e.g., the minimum subset size that is usable for estimating the UE's 405 position) can be set to four for TDOA and to three for RTT. This minimum subset size can be predefined or can be dynamically updated depending on a number of factors, such as the number of neighboring TRPs. In addition, the consistency groups for TDOA and RTT may be the same, whereas the consistency groups for AoD may be different. Further, consistency groups can be reported across all positioning methods. In this case, a separate measurement report may be defined in the LPP, in addition or alternative to including the information about the consistency groups in the positioning measurement reports.

In an example, the reporting of consistency groups could be per frequency layer or across frequency layers. In addition, the UE 405 may report a hierarchical consistency group. For instance, this consistency group may include the TRPs that are consistent. Within each TRP, the consistency group may include specific PRS resource sets. Inside each set, the consistency group may include the PRS resources that are consistent. The reporting may identify this hierarchy by including the identifiers of the TRPs, the identifiers of the PRS resource sets for each TRP identifier, and the identifiers of the PRS resources for each PRS resource set identifier.

To illustrate, consider a TDOA example, where the device 320 is a location server. In this example, the UE 405 reports 500 RSTD measurements. For each reported RSTD measurement, the reported information includes an identifier of a measured TRP, an identifier of a PRS resource set, an identifier of a PRS resource, and a timestamp, among other information as previously described in connection with FIG. 3. Here also, the reported information includes an integer that identifies the consistency group to which this hierarchy of TRP, PRS resource set, and PRS resource belongs. This consistency group identifier (e.g., the ID that is an integer) is not needed for additional TOAs for each RSTD measurement. This integer can be set to zero if the hierarchy does not belong to any consistency group, or to a value that identifies a particular consistency group (e.g., to a one for a first consistency group, a two for a second consistency group, and so on and so forth). In other words, the UE 405 continues to report 500 its RSTD measurements and associates some or each of the RTSD measurements with a consistency group as applicable by including the identifier (e.g., an integer) of the consistency group in the reported RSTD measurement information. The example of this reporting is shown below (where "nr-Consistency-Group" corresponds to the reporting of the consistency group; other nomenclature is possible, such as nr-LOS-Group).

```
NR-DL-TDOA-MeasElement-r16 ::= SEQUENCE {
trp-ID-r16                              TRP-ID-r16,
nr-DL-PRS-ResourceId-r16                NR-DL-PRS-ResourceId-r16           OPTIONAL,
nr-DL-PRS-ResourceSetId-r16               NR-DL-PRS-ResourceSetId-r16      OPTIONAL,
nr-TimeStamp-r16                        NR-TimeStamp-r16,
nr-RSTD-r16                             INTEGER (0..ffs),                  -- FFS on the value range
nr-Consistency-Group-r17                INTEGER (FFS)
nr-AdditionalPathList-r16               NR-AdditionalPathList-r16          OPTIONAL,
nr-TimingMeasQuality-r16                NR-TimingMeasQuality-r16,
nr-PRS-RSRP-Result-r16                  INTEGER (FFS)                      OPTIONAL,
-- FFS, value range to be decided in RAN4.
nr-DL-TDOA-AdditionalMeasurements-r16
NR-DL-TDOA-AdditionalMeasurements-r16                                      OPTIONAL,
    ...
}
```

In another illustration, consider an RTT example, where the device 320 is also a location server. In this example, the UE 405 reports 500 Rx-Tx time difference measurements. For each reported Rx-Tx time difference measurement, the reported information includes an identifier of a measured TRP, an identifier of a PRS resource set, an identifier of a PRS resource, and a timestamp, among other information. Here also, the reported information includes an integer that identifies the consistency group to which this hierarchy of TRP, PRS resource set, PRS resource belongs. This consistency group identifier (e.g., the ID that is an integer) is not needed for additional TOAs for each Rx-Tx time difference measurement. This integer can be set to zero if the hierarchy does not belong to any consistency group, or to a value that identifies a particular consistency group (e.g., to a one for a first consistency group, a two for a second consistency group, and so and so forth). In other words, the UE 405 continues to report 500 its Rx-Tx time difference measurements and associates some or each of the Rx-Tx time difference measurements with a consistency group as applicable by including the identifier (e.g., an integer) of the consistency group in the reported Rx-Tx time difference measurement information. The example of this reporting is shown below (where "nr-Consistency-Group" corresponds to the reporting of the consistency group; other nomenclature is possible, such as nr-LOS-Group).

```
NR-Multi-RTT-MeasElement-r16 ::= SEQUENCE {
    trp-ID-r16                          TRP-ID-r16,
    nr-DL-PRS-ResourceId-r16                NR-DL-PRS-ResourceId-r16
    OPTIONAL,
    nr-DL-PRS-ResourceSetId-r16             NR-DL-PRS-ResourceSetId-r16
    OPTIONAL,
    nr-UE-RxTxTimeDiff-r16              INTEGER (FFS)
    OPTIONAL,
    -- FFS on the value range to be decided in RAN4
    nr-Consistency-Group-r17            INTEGER (FFS)
    nr-AdditionalPathList-r16           NR-AdditionalPathList-r16          OPTIONAL,
    nr-TimeStamp-r16                    NR-TimeStamp-r16,
    nr-TimingMeasQuality-r16                NR-TimingMeasQuality-r16,
    nr-PRS-RSRP-Result-r16              INTEGER (FFS)                      OPTIONAL,
    -- FFS, value range to be decided in RAN4.
    nr-Multi-RTT-AdditionalMeasurements-r16
    NR-Multi-RTT-AdditionalMeasurements-r16                                OPTIONAL,
        ...
    }
```

In yet another illustration, consider an AoD example, where the device 320 is also a location server. In this example, the UE 405 reports 500 RSRP measurements. For each reported RSRP measurement, the reported information includes an identifier of a measured TRP, an identifier of a PRS resource set, an identifier of a PRS resource, and a timestamp, among other information. Here also, the reported information includes an integer that identifies the consistency group to which this hierarchy of TRP, PRS resource set, and PRS resource belongs. This consistency group identifier (e.g., the ID that is an integer) is not needed for additional RSPRs. This integer can be set to zero if the hierarchy does not belong to any consistency group, or to a value that identifies a particular consistency group (e.g., to a one for a first consistency group, a two for a second consistency group, and so on and so forth). In other words, the UE 405 continues to report 500 its RSRP measurements and associates some or each of the RSRP measurements with a consistency group as applicable by including the identifier (e.g., an integer) of the consistency group in the reported RSRP measurement information. The example of this reporting is shown below (where "nr-Consistency-Group" corresponds to the reporting of the consistency group; other nomenclature is possible, such as nr-LOS-Group).

```
NR-DL-AoD-MeasElement-r16 ::= SEQUENCE {
    trp-ID-r16                          TRP-ID-r16,
    nr-DL-PRS-ResourceId-r16            NR-DL-PRS-ResourceId-r16
    OPTIONAL,
    nr-DL-PRS-ResourceSetId-r16         NR-DL-PRS-ResourceSetId-r16
    OPTIONAL,
    nr-TimeStamp-r16                    NR-TimeStamp-r16,
    nr-PRS-RSRP-Result-r16              INTEGER (FFS)                OPTIONAL,
    nr-Consistency-Group-r17            INTEGER (FFS)
    -- Need RAN4 inputs on value range
    nr-DL-PRS-RxBeamIndex-r16           INTEGER (1..8),
    nr-DL-Aod-AdditionalMeasurements-r16
    NR-DL-AoD-AdditionalMeasurements-r16
    OPTIONAL,
    ...
}
```

Of course, other types of consistency group reporting are possible. For instance, a report may be generated per consistency group or for multiple consistency groups. The report may identify each consistency group (if one report is created for multiple consistency groups) and may list the identifiers of the elements that belong to the consistency group (e.g., frequency layers only, TRPs only, resource sets only, PRS resources only, PRS measurements only, a combination of any of these elements, or a hierarchy of any of these elements). In addition, the report may include one or more timestamps to assist with the determination of a time period during which a consistency group may be valid. The report(s) may be sent in a message to the location server during the LPP session according to an LPP reporting protocol. An example of the information included in such a report is shown below (where "group-ID" corresponds to the identifier of a consistency group; other nomenclature is possible).

```
NR-DL-ConsistencyGroup ::= SEQUENCE {
    trp-ID                              TRP-ID,
    nr-DL-PRS-ResourceId-r16            NR-DL-PRS-ResourceId-r16
    OPTIONAL,
    nr-DL-PRS-ResourceSetId-r16         NR-DL-PRS-ResourceSetId-r16
    OPTIONAL,
```

-continued

```
    group-ID                            INTEGER(FFS)
    ...
}
```

If the device 320 is another UE with which a sidelink exists or can be established, the UE 405 can generate and send a report about one or more consistency groups to this UE via the sidelink. The report can include the above information. However, the PRS resources and the PRS resource sets determined consistent for the UE 405 may not be relevant to the nearby UE. As such, the report may be slightly different by including identifiers of the consistent TRPs and the identifier of the consistency group and excluding the identifiers of the PRS resources and PRS resource sets. Here also, an identifier of a TRP may not include a local identifier and may instead include the physical cell identifier and the cell global identifier.

Figure 6:
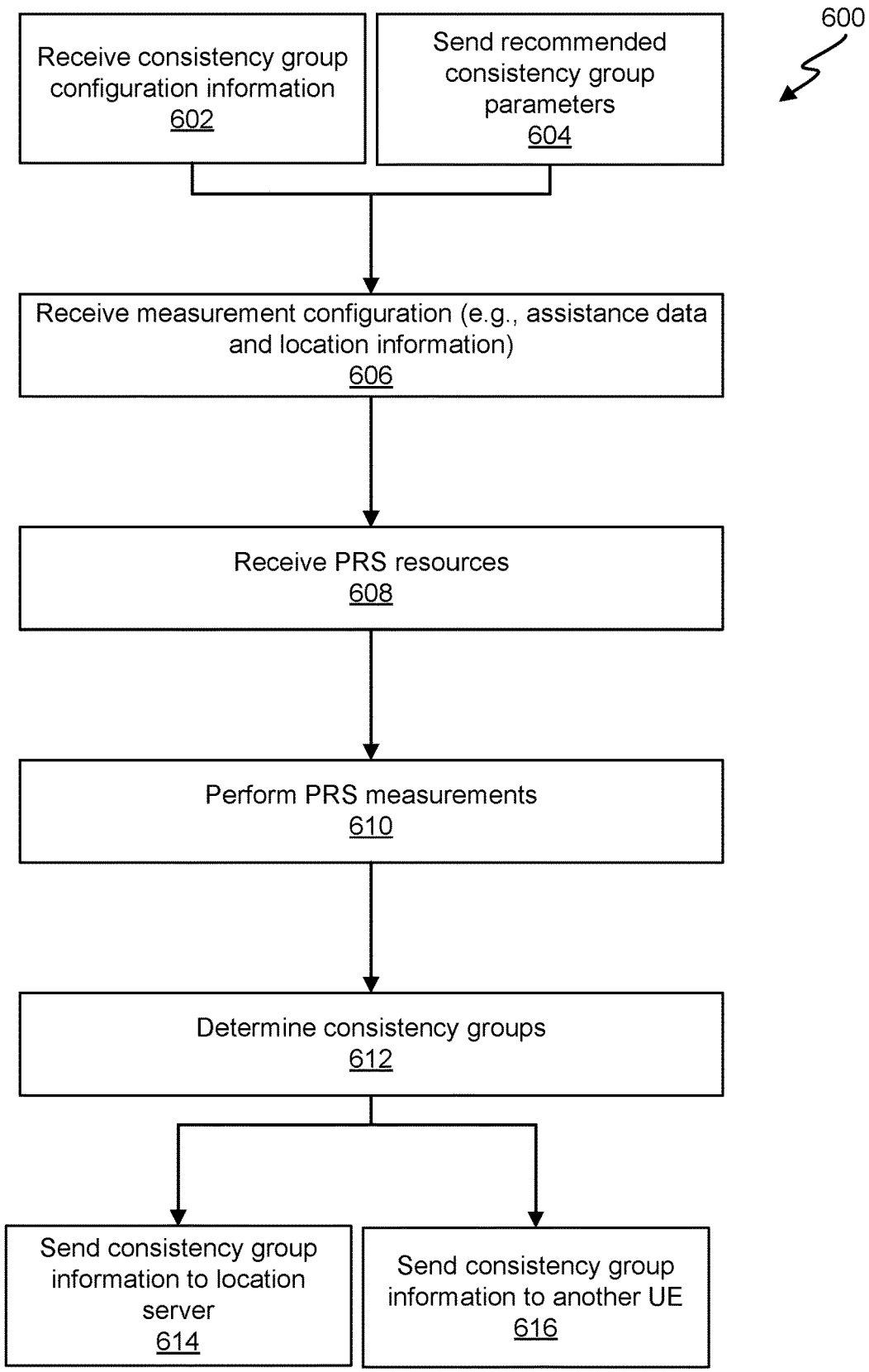
FIG. 6 illustrates an example of a flow for reporting information about consistency groups, in accordance with at least one embodiment.
Figure 7:
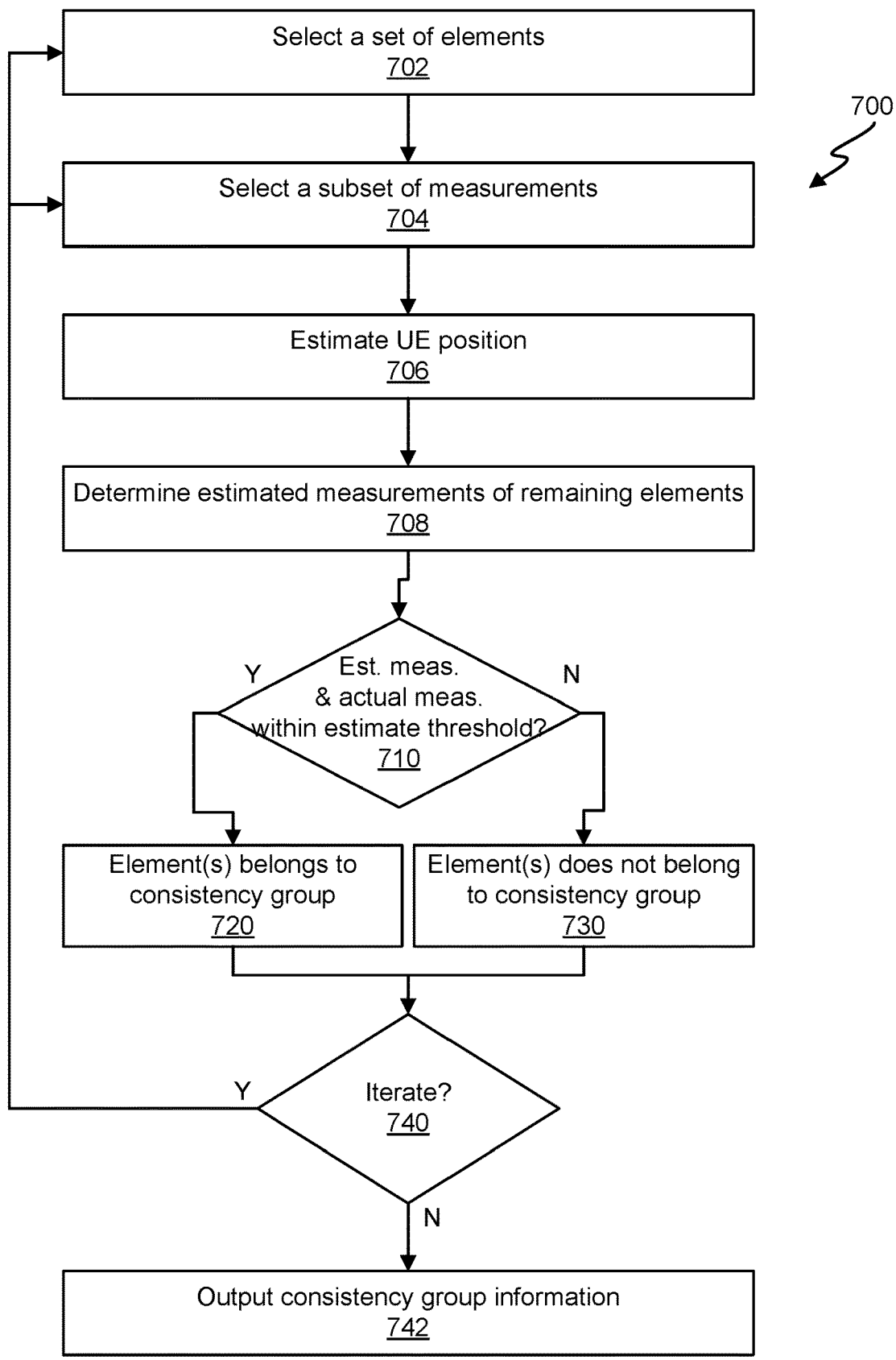
FIG. 7 illustrates another example of a flow for determining consistency groups, in accordance with at least one embodiment.
Figure 8:
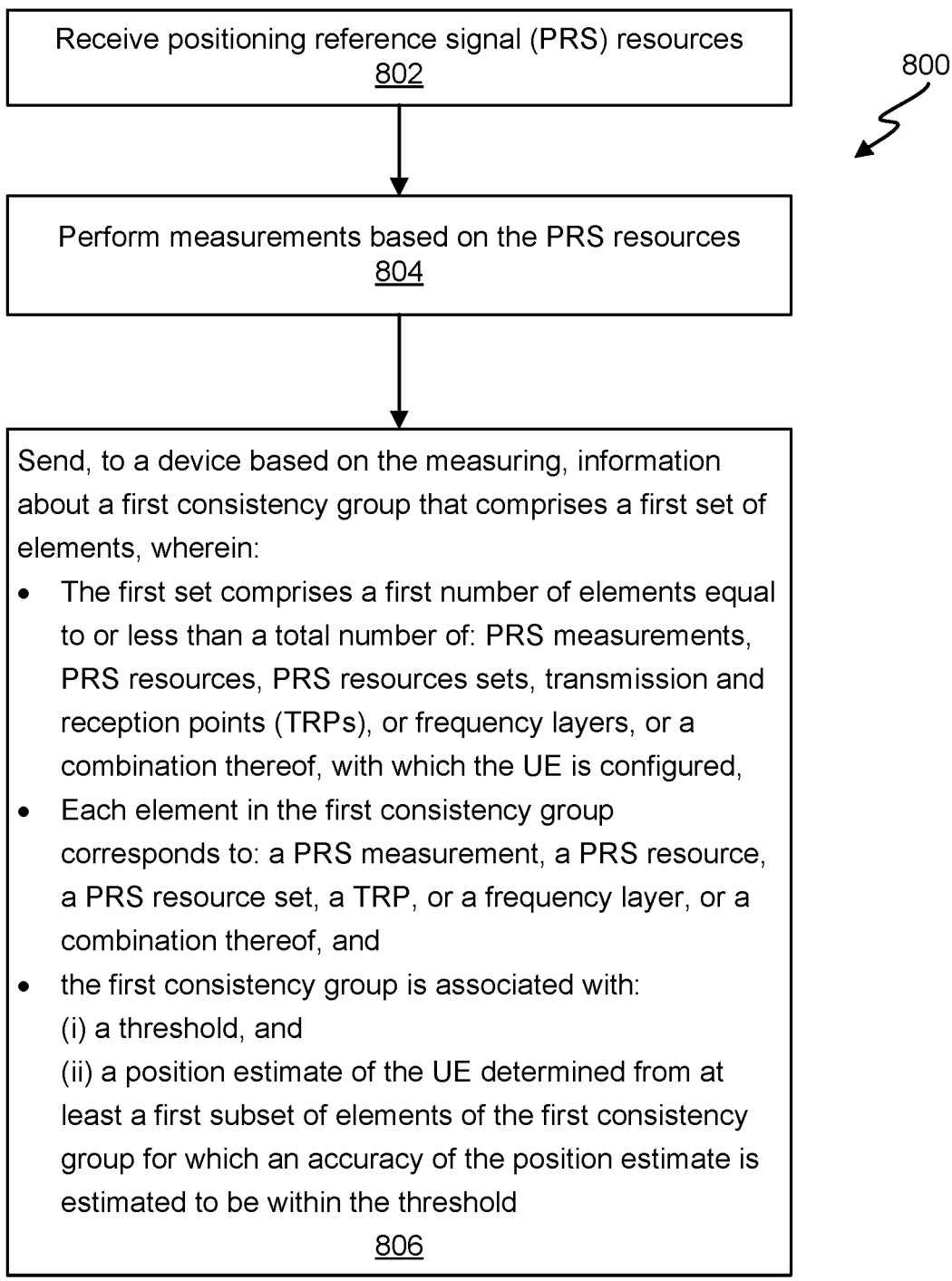
FIG. 8 illustrates a further example of a flow for a method for reporting measurement consistencies in support of positioning a UE, in accordance with at least one embodiment.

FIGS. 6-8 show illustrative flows related to determining and reporting consistency groups, in accordance with various embodiments. Some or all of the instructions for performing the operations of the illustrative flows can be implemented as hardware circuitry and/or stored as computer-readable instructions on a non-transitory computer-readable medium of a UE (e.g., the UE 405). Equivalent or corresponding operations may be also implemented as hardware circuitry and/or stored as computer-readable instructions on a non-transitory computer-readable medium of a device (e.g., the device 320). As implemented, the instructions represent modules that include circuitry or code executable by a processor(s) of the UE or the device, as applicable. The use of such instructions configures the UE or the device, as applicable, to perform the specific operations described herein. Each circuitry or code in combination with the processor represents a means for performing a respective operation(s). For instance, means for performing the functionality at each operation of the target shown in FIGS. 6-8 may comprise software and/or hardware components of the UE, such as the bus 1005, processing unit(s) 1010, DSP 1020, wireless communication interface 1030, memory 1060, and/or other components of the UE 1000 illustrated in FIG. 10 and described in more detail below. While the operations are illustrated in a particular order, it should be understood that no particular order is necessary and that one or more operations may be omitted, skipped, performed in parallel, and/or reordered.

FIG. 6 illustrates an example of a flow 600 for reporting information about consistency groups, in accordance with at least one embodiment. In an example, the flow includes operation 602, where the UE receives consistency group configuration information from the device. For instance, this configuration information relates to the reporting of consistency groups and includes parameters defining aspects of the reporting. In particular, the consistency group configuration information indicates any of the elements to report on (e.g., whether PRS measurements, PRS resources, PRS resource sets, TRPs, and/or frequency layers should be reported), any of the parameters of the consistency group(s) (e.g., number of elements N, minimum subset size X, threshold(s)), and the number of consistency groups. The consistency group configuration information can be in a message from the device, for instance, during an LPP session with the device.

In an example, the flow includes operation 604, where this operation may be performed additionally or alternatively to operation 602. At operation 604, some or all of the parameters defining aspects of the reporting may be preset in the UE, and the UE sends a recommendation that includes some or all of these parameters. This recommendation can be sent in a message to the device, for instance, during the LPP session with the device.

In an example, the flow includes operation 606, where the UE receives measurement configuration from the device. The operation 606 can follow either operation 602 or operation 604. The configuration information can include assistance data (including, for instance, positions of TRPs) received in a "provide assistance data" message as well as parameters for performing positioning measurements received in a "request location information" message.

In an example, the flow includes operation 608, where the UE receives PRS resources. For instance, PRS resources are allocated in particular resource elements and belong to one or more particular resource sets per TRP and/or frequency layer according to PRS configuration information. Given the PRS configuration information and the assistance data, the UE determines the slots, subframes, and frames for downlink transmissions from the different TRPs in which the PRS resources are sent.

In an example, the flow includes operation 610, where the UE performs PRS measurements. These measurements depend on the positioning method that is to be supported (e.g., as indicated in the "request location information" message), for instance, TOA measurements to determine RSTD measurements in support of a TDOA positioning method. Rx-Tx time difference measurements can be determined for an RTT positioning method, and AoD and RSRP measurements can be determined for an AoD positioning method.

In an example, the flow includes operation 612, where the UE determines consistency group(s). For instance, the UE performs an outlier detection algorithm on the PRS measurements. The outlier detection algorithm analyzes the PRS measurements by using the parameters defined in the consistency group configuration information or recommended by the UE to iteratively define each of the consistency group(s).

In an example, the flow includes operation 614, where the UE sends information about the consistency group to a location server. Here, the location server can be the same device described herein above in connection with operations 602-606. Some of the information (e.g., an identifier of a consistency group) can be included in the measurement reports used to send the PRS measurements to the location server. Additionally or alternatively, one or more separate reports may be generated specifically for the consistency group(s) and sent to the location server during the LPP session. A report can be sent per positioning method or for the different positioning methods and can be specific to a frequency layer or applicable across frequency layers. A report may also include a hierarchy consistency group.

In an example, the flow includes operation 616, where the UE additionally or alternatively sends information about the consistency group to another UE. Here, a report specific to the consistency group(s) may be generated and sent to the other UE via a sidelink between the two UEs. The report may identify each consistency group and list the identifiers of the TRPs that belong to the consistency group.

FIG. 7 illustrates another example of a flow 700 for determining consistency groups, in accordance with at least one embodiment. The flow 700 is one illustrative example of performing an outlier detection algorithm. In the interest of clarity of explanation, the flow is described by using TRPs as examples of elements that can be added to the consistency groups. However, other types of elements are possible, and the flow 700 can be similarly applied for these elements.

In an example, the flow 700 includes operation 702, where the UE selects a random set of elements. For instance, there are twenty TRPs that are nearby the UE and that send PRS to the UE. Based on consistency group configuration information, the consistency group is to include Y elements, where Y is ten. Of course, if such a parameter is not configured, the selection can be for a random number of Y elements.

In an example, the flow 700 includes operation 704, where the UE selects a subset of measurements. The subset can be selected to meet a minimum subset size X. For instance, X is set to four in the consistency group configuration information or predefined locally at the UE for a positioning method. Accordingly, out of the ten randomly selected TRPs, four of these TRPs are randomly selected and the PRS measurements of these four TRPs are selected.

In an example, the flow 700 includes operation 706, where the UE estimates its position given the selected PRS measurements. For instance, TOA measurements are used to derive the UE's estimated position. This position is referred to as a baseline position.

In an example, the flow 700 includes operation 708, where the UE determines estimated measurements of the remaining elements of the set. For instance, for each TRP of the six remaining elements (e.g., Y—X elements), the UE determines the TRP's position (e.g., based on assistance data) and estimates the TOA for that TRP given its estimated position and the TRP's position.

In an example, the flow 700 includes operation 710, where the UE compares an estimated measurement with a PRS measurement. Here, the comparison can be for each TRP of the six remaining elements. In particular, the UE compares the estimated TOA to a median, maximum, or average TOA measurement derived from PRS measurements for the TRP. In another illustration, the comparison can be for the remaining six TRP elements. In particular, the UE compares a median, maximum, or average TOA derived from the six estimated TOAs to a median, maximum, or average TOA measurement derived from PRS measurements for the six TRPs. In yet another illustration, the comparison can be at the group level. In particular, the UE estimates a position of the UE from the PRS measurements of the six TRPs, or the UE determines an update to its position estimated at operation 706, where the update is determined from the PRS measurements of the six TRPs. In these different illustrations, the comparison is to a threshold (e.g., a measurement threshold in the first two illustrations and an estimate threshold in the last illustration), where the threshold can be indicated in the consistency group configuration information or predefined locally at the UE. If the comparison indicates that the estimation using the remaining elements (e.g., the PRS measurements of the six TRPs) results in an expected error that is smaller than the threshold, operation 720 may be performed. Otherwise, operation 730 may be performed.

In an example, the flow 700 includes operation 720, where the UE determines that the element(s) belong to the consistency group. Depending on the type of comparison performed at operation 710, one or more elements can be included in the consistency group. For instance, if the comparison was for a specific TRP (e.g., one out of the six remaining TRPs), that TRP is added to the consistency group. If the comparison for more than one TRPs, these TRPs are added to the consistency group.

In an example, the flow 700 includes operation 730, where the UE determines that the element(s) does not belong to the consistency group. Here also, depending on the type of comparison performed at operation 710, one or more elements can be excluded from the consistency group. For instance, if the comparison was for a specific TRP (e.g., one out of the six remaining TRPs), that TRP is not added to the consistency group. If the comparison was for more than one TRPs, these TRPs are not added to the consistency group.

In an example, the flow 700 includes operation 740, where the UE determines whether another iteration is to be performed. Different convergence criteria are possible to use. One criterion relates to a maximum number of iterations for selecting the subset of measurements. If that number has not been reached yet, the flow may loop back to operation 704. Another criterion relates to whether the desired number of elements (e.g., Y) has been added to the consistency group. If that number has not been reached yet, the flow may loop back to operation 702. Yet another criterion relates to, in the absence of the desired number, maximizing the size of the consistency group. If that number has not been maximized yet, the flow may loop back to operation 702. An additional criterion relates to a maximum number of iterations for selecting the set of elements. If that number has not been reached yet, the flow may loop back to operation 702.

In an example, the flow 700 includes operation 742, where the UE has determined that one or more of the convergence criteria have been met. Accordingly, the UE outputs information about the consistency group. This information includes the identifies of the elements that belong to the consistency group. The flow 700 can be repeated to define, from any other remaining elements that were not added to the consistency group, one or more additional consistency groups by varying some of the parameters (e.g., the minimum subset size, the threshold).

FIG. 8 illustrates a further example of a flow 800 for a method for reporting measurement consistencies in support of positioning a UE, in accordance with at least one embodiment. In an example, the flow 800 includes operation 802, where the UE receives positioning reference signal (PRS) resources. Means for performing the functionality at operation 802 may comprise software and/or hardware components of the UE, such as the bus 1005, processing unit(s) 1010, DSP 1500, wireless communication interface 1500, memory 1060, and/or other components of the UE 1000 illustrated in FIG. 10 and described in more detail below.

In an example, the flow 800 includes operation 804, where the UE performs measurements based on the PRS resources. As noted with regard to operation 610 of FIG. 6, measurements may vary depending on type of positioning performed. Means for performing the functionality at operation 804 may comprise software and/or hardware components of the UE, such as the bus 1005, processing unit(s) 1010, DSP 1500, wireless communication interface 1500, memory 1060, and/or other components of the UE 1000 illustrated in FIG. 10 and described in more detail below.

In an example, the flow 800 includes operation 806, where the UE sends, to a device based on the performed measurements, information about a first consistency group that comprises a first set of elements, wherein: the first set comprises a first number of elements equal to or less than a total number of: PRS measurements, PRS resources, PRS resources sets, transmission and reception points (TRPs), or frequency layers, or a combination thereof, with which the UE is configured. Each element in the first consistency group corresponds to: a PRS measurement, a PRS resource, a PRS resource set, a TRP, or a frequency layer, or a combination thereof. The first consistency group is associated with: (i) a threshold, and (ii) a position estimate of the UE determined from at least a first subset of elements of the first consistency group for which an accuracy of the position estimate is estimated to be within the threshold. Means for performing the functionality at operation 806 may comprise software and/or hardware components of the UE, such as the bus 1005, processing unit(s) 1010, DSP 1500, wireless communication interface 1500, memory 1060, and/or other components of the UE 1000 illustrated in FIG. 10 and described in more detail below.

Depending on desired functionality, embodiments may include one or more additional features, as discussed in the previously-described embodiments. Examples of such features are described in the following paragraphs.

In an example, the method defined in part by the flow 800 includes determining a second set of one or more elements for which the accuracy of the position estimate of the UE determined from one or more elements of the second set is estimated to be beyond the threshold.

In an example, the device includes a location server. In this example, the method defined in part by the flow 800 includes one or more additional operations. At an additional operation, the UE receives, from the location server, assistance data indicating TRP positions. Additionally, according to some embodiments, assistance data may indicate TRP IDs to link each identified TRP with a particular position. The information about the consistency group may be determined based on the TRP positions. Further, at an additional optional operation, the UE may determine the information by at least performing an outlier detection algorithm on the PRS measurements. The TRP positions may be input to the outlier detection algorithm.

In an example, at additional operations, the UE receives, from a location server, configuration information associated with parameters for one or more consistency groups and determines the first consistency group based on the parameters and the performed measurements. In this example, the parameters may indicate a number of consistency groups to determine, a number of elements per consistency group, a minimum subset size to generate a position estimate per consistency group, or an estimate threshold per consistency group, or a combination thereof.

In an example, at an additional operation, the UE determines the consistency group based on predefined parameters and the performed measurements. In this example, the predefined parameters may be stored at the UE and may indicate a number of consistency groups to determine, a number of elements per consistency group, a minimum subset size to generate a position estimate per consistency group, or an estimate threshold per consistency group, or a combination thereof.

In an example, at an additional operation, the UE sends, to the device, a plurality of information each of which being specific to a consistency group of a plurality of consistency groups. In this example, each one of the plurality of consistency groups may be associated with a number of elements for the consistency group, a minimum subset size to generate a position estimate for the consistency group, or an estimate threshold for the consistency group that is different from another estimate threshold for another consistency group, or a combination thereof.

In an example, at an additional operation, the UE sends, to the device, a plurality of information each of which being specific to a set of consistency groups for a positioning measurement report from one or more positioning measurement reports. In this example, the one or more positioning measurement reports may include a time difference of arrival (TDOA) positioning measurement report, a round trip time (RTT) positioning measurement report, and an angle of arrival (AoD) positioning measurement report. In this example also, first information about consistency groups for the TDOA positioning measurement report may be the same as second information about consistency groups for the RTT positioning measurement report. In this example also, for a TDOA positioning measurement report the first subset of elements may comprise at least four elements, and for a round trip time (RTT) positioning measurement report the first subset of elements may comprise at least three elements.

In an example, at an additional operation, the UE sends, to the device, a measurement report that identifies, per positioning methods, one or more consistency groups and elements included in each one of the one or more consistency groups.

In an example, the information may identify one or more TRPs that belong to the first consistency group, one or more PRS resource sets that belong to the first consistency group, a plurality of PRS resources that belong to the first consistency group, or a timestamp associated with the first consistency group, or a combination thereof.

In an example, the information may identify the first consistency group and a hierarchy of one or more TRPs that belong to the first consistency group, one or more PRS resources per TRP of the first consistency group, and one or more PRS resources per PRS resource set of the first consistency group.

In an example, the information may include an identifier of the first consistency group and sending the information may comprise sending, to the device, a time difference of arrival (TDOA) measurement element that includes a reference signal time difference (RSTD) measurement and the identifier, a round trip time (RTT) measurement element that includes a reception-transmission time difference (Rx-Tx) measurement and the identifier, or an angle of departure (AoD) measurement element that includes a reference signal received power (RSRP) measurement and the identifier, or a combination thereof.

In an example, the device includes a location server. In this example, the information about the first consistency group may be sent in a message to the location server during a positioning session between the UE and the location server, or via a sidelink between the UE and a second UE. In this example also, the information may identify the first consistency group and one or more TRPs that belong to the first consistency group. Additionally or alternatively, the information may identify a plurality of TRPs and whether each one of the plurality of TRPs is associated with the first consistency group.

In an example, measuring the positioning reference signals may include measuring times of arrival (TOAs) of the positioning reference signals, and wherein the estimate threshold may correspond to a TOA error threshold.

Means for performing the functionality at each additional operation of the method may comprise software and/or hardware components of the UE, such as the bus 1005, processing unit(s) 1010, DSP 1500, wireless communication interface 1500, memory 1060, and/or other components of the UE 1000 illustrated in FIG. 10 and described in more detail below.

Figure 9:
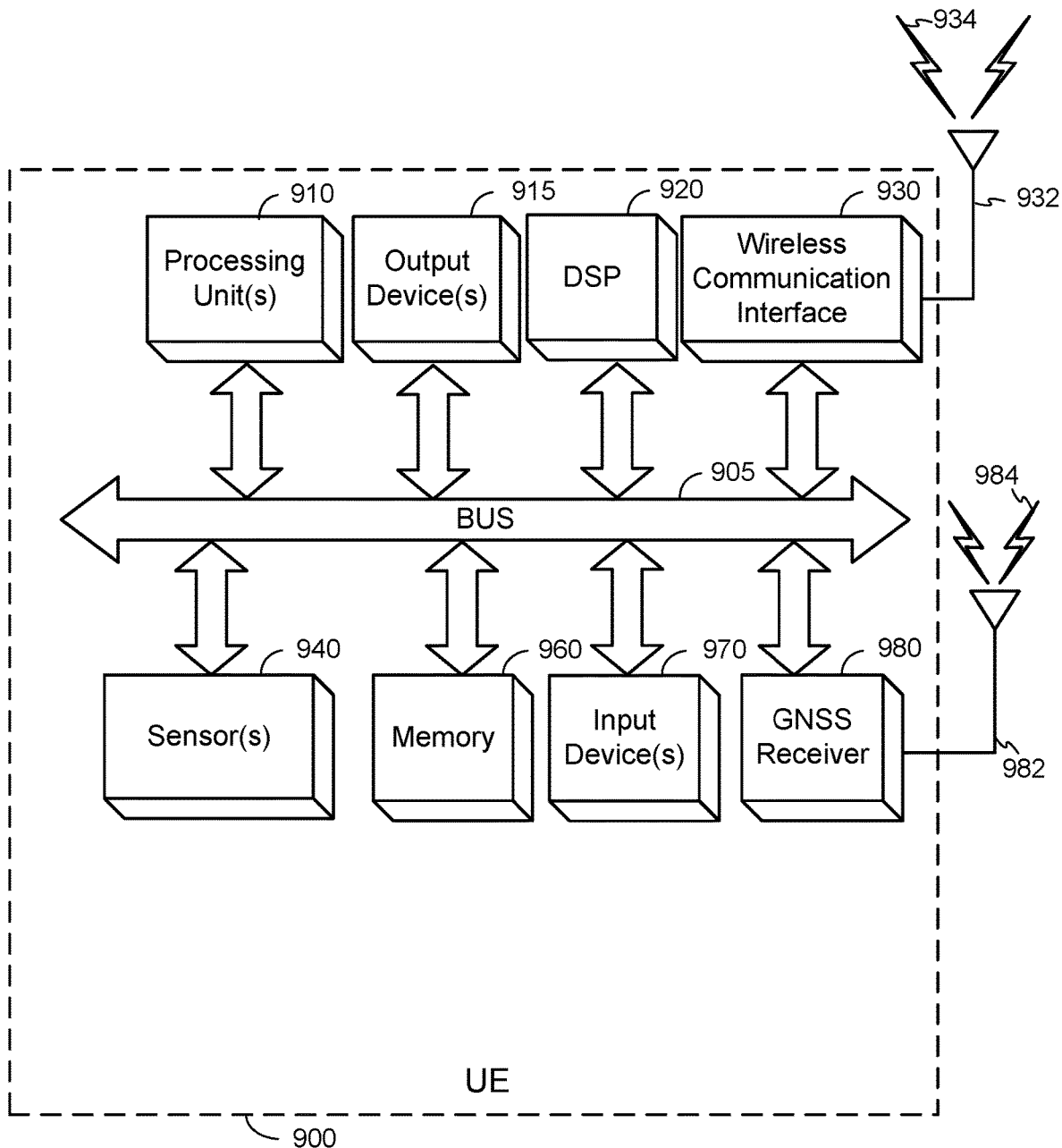
FIG. 9 is a block diagram of an embodiment of a UE, which can be utilized as described in the embodiments described herein and in association with FIGS. 1-8.

FIG. 9 is a block diagram of an embodiment of a UE 900, which can be utilized as described in the embodiments described herein and in association with FIGS. 1-8. The UE 900 is an example of the UE 405 described herein above. It should be noted that FIG. 9 is meant only to provide a generalized illustration of various components of UE 900, any or all of which may be utilized as appropriate. In other words, because UEs can vary widely in functionality, they may include only a portion of the components shown in FIG. 9. It can be noted that, in some instances, components illustrated by FIG. 9 can be localized to a single physical device and/or distributed among various networked devices, which may be disposed at different physical locations.

The UE 900 is shown comprising hardware elements that can be electrically coupled via a bus 905 (or may otherwise be in communication, as appropriate). The hardware elements may include a processing unit(s) 910 which may comprise without limitation one or more general-purpose processors, one or more special-purpose processors (such as digital signal processing (DSP) chips, graphics acceleration processors, application-specific integrated circuits (ASICs), and/or the like), and/or other processing structure or means, which can be configured to perform one or more of the methods described herein. As shown in FIG. 9, some embodiments may have a separate DSP 920, depending on desired functionality. The UE 900 also may comprise one or more input devices 970, which may comprise without limitation one or more touch screens, touch pads, microphones, buttons, dials, switches, and/or the like; and one or more output devices 915, which may comprise without limitation one or more displays, light-emitting diodes (LEDs), speakers, and/or the like.

The UE 900 might also include a wireless communication interface 930, which may comprise without limitation a modem, a network card, an infrared communication device, a wireless communication device, and/or a chipset (such as a Bluetooth device, an IEEE 802.11 device, an IEEE 802.15.4 device, a Wi-Fi device, a WiMAX™ device, or cellular communication facilities), and/or the like, which may enable the UE 900 to communicate via the networks described herein with regard to FIGS. 1-8. The wireless communication interface 930 may permit data to be communicated with a network, eNBs, ng-eNBs, gNBs, and/or other network components, computer systems, and/or any other electronic devices described herein. The communication can be carried out via one or more wireless communication antenna(s) 932 that send and/or receive wireless signals 934.

Depending on desired functionality, the wireless communication interface 930 may comprise separate transceivers to communicate with BSs (e.g., eNBs, ng-eNBs, and/or gNBs) and other terrestrial transceivers, such as wireless devices and APs. The UE 900 may communicate with different data networks that may comprise various network types. For example, a Wireless Wide Area Network (WWAN) may be a CDMA network, a Time-Division Multiple Access (TDMA) network, a Frequency-Division Multiple Access (FDMA) network, an Orthogonal Frequency-Division Multiple Access (OFDMA) network, a Single-Carrier Frequency-Division Multiple Access (SC-FDMA) network, a WiMax (IEEE 802.16), and so on. A CDMA network may implement one or more RATs such as CDMA2000, Wideband-CDMA (WCDMA), and so on. CDMA2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, NR, and so on. 5G, LTE, LTE Advanced, NR, GSM, and WCDMA are described in documents from 3GPP. CDMA2000 is described in documents from a consortium named 3rd Generation Partnership Project 2 (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN, and/or WPAN.

The UE 900 can further include sensor(s) 940. Such sensors may comprise without limitation one or more inertial sensors (e.g., accelerometer(s), gyroscope(s), and or other Inertial Measurement Units (IMUs)), camera(s), magnetometer(s), a compass, altimeter(s), microphone(s), proximity sensor(s), light sensor(s), a barometer, and the like, some of which may be used to complement and/or facilitate the functionality described herein.

Embodiments of the UE 900 may also include a GNSS receiver 980 capable of receiving signals 984 from one or more GNSS satellites (e.g., SVs 190) using a GNSS antenna 982 (which may be combined in some implementations with antenna(s) 932). Such positioning can be utilized to complement and/or incorporate the techniques described herein. The GNSS receiver 980 can extract a position of the UE 900, using conventional techniques, from GNSS SVs (e.g., SVs 190) of a GNSS system, such as GPS, Galileo, GLONASS, Compass, Quasi-Zenith Satellite System (QZSS) over Japan, IRNSS over India, Beidou over China, and/or the like. Moreover, the GNSS receiver 980 can use various augmentation systems (e.g., a Satellite-Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as WAAS, EGNOS, Multi-Functional Satellite Augmentation System (MSAS), GPS-Aided GEO Augmented Navigation or GPS-Aided GEO Augmented Navigation System (GAGAN), and/or the like. Thus, as used herein, a GNSS may include any combination of one or more global and/or regional navigation satellite systems and/or augmentation systems, and GNSS signals may include GNSS, GNSS-like, and/or other signals associated with such one or more GNSS.

The UE 900 may further include and/or be in communication with a memory 960. The memory 960 may comprise without limitation local and/or network accessible storage; a disk drive; a drive array; an optical storage device; a solid-state storage device, such as a random access memory ("RAM"); and/or a read-only memory ("ROM"), which can be programmable, flash-updateable, and/or the like. Such storage devices may be configured to implement any appropriate data stores, including without limitation various file systems, database structures, and/or the like.

The memory 960 of the UE 900 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the UE 900 (e.g., using processing unit(s) 910). In an aspect, then, such code and/or instructions can be used to configure and/or adapt a general-purpose computer (or other device) to perform one or more operations in accordance with the described methods.

Figure 10:
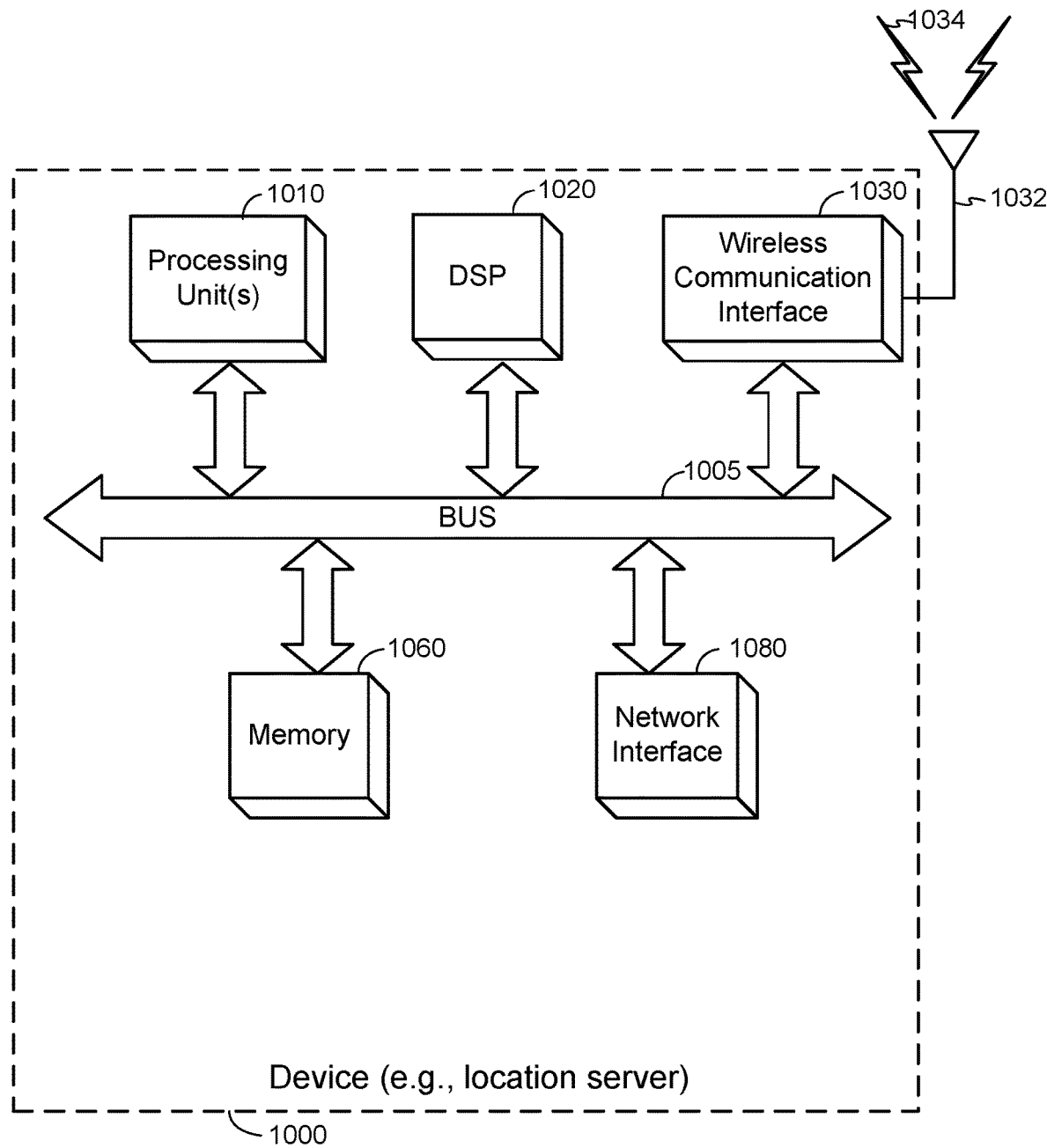
FIG. 10 illustrates an embodiment of a device, which can be utilized as described herein and in association with FIGS. 1-8.

FIG. 10 illustrates an embodiment of a device 1000, which can be utilized as described herein and in association with FIGS. 1-8. The device 1000 is an example of the device 320 described herein above. The components of the device 1000 are used to implement a UE or a location server. In the case of a location server implementation, the location server may be a standalone component of a communication system or can be integrated with another component of the network system, such as with a BS. It should be noted that FIG. 10 is meant only to provide a generalized illustration of various components, any or all of which may be utilized as appropriate.

The device 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as DSP chips, graphics acceleration processors, ASICs, and/or the like), and/or other processing structure or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below), according to some embodiments. The device 1000 also can include one or more input devices, which can include without limitation a keyboard, display, mouse, microphone, button(s), dial(s), switch(es), and/or the like; and one or more output devices, which can include without limitation a display, LED, speakers, and/or the like.

The device 1000 might also include a wireless communication interface 1030, which may comprise without limitation a modem, a network card, an infrared communication device, a wireless communication device, and/or a chipset (such as a Bluetooth device, an IEEE 802.11 device, an IEEE 802.15.4 device, a Wi-Fi device, a WiMAX device, or cellular communication facilities), and/or the like, which may enable the device 1000 to communicate as described herein. The wireless communication interface 1030 may permit data and signaling to be communicated (e.g., transmitted and received) UEs, BSs (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 1034.

The device 1000 may also include a network interface 1080, which can include support of wireline communication technologies. The network interface 1080 may include a modem, network card, chipset, and/or the like. The network interface 1080 may include one or more input and/or output communication interfaces to permit data to be exchanged with a network, communication network servers, computer systems, and/or any other electronic devices described herein.

In many embodiments, the device 1000 will further comprise a memory 1060. The memory 1060 can include without limitation local and/or network accessible storage; a disk drive; a drive array; an optical storage device; a solid-state storage device, such as a RAM; and/or a ROM, which can be programmable, flash-updateable, and/or the like. Such storage devices may be configured to implement any appropriate data stores, including without limitation various file systems, database structures, and/or the like.

The memory 1060 of the device 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the device 1000 (and/or processing unit(s) 1010 or DSP 1020 within device 1000). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network I/O devices may be employed.

With reference to the appended figures, components that can include memory can include non-transitory machine-readable media. The terms "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to non-volatile media, volatile media, and transmission media. Common forms of computer-readable media include, for example, magnetic and/or optical media, any other physical medium with patterns of holes, a RAM, a programmable ROM (PROM), an erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves, and thus many of the elements are examples that do not limit the scope of the disclosure to those specific examples.

It has proved convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special-purpose computer or a similar special-purpose electronic computing device. In the context of this Specification, therefore, a special-purpose computer or a similar special-purpose electronic computing device is capable of manipulating or transforming signals, typically represented as physical electronic, electrical, or magnetic quantities within memories, registers, or other information storage devices, transmission devices, or display devices of the special-purpose computer or similar special-purpose electronic computing device.

Terms "and" and "or," as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for reporting measurement consistencies in support of positioning, the method implemented by a user equipment (UE) and comprising: receiving positioning reference signal (PRS) resources; performing measurements based on the PRS resources; and sending, to a device based on the performed measurements, information about a first consistency group that comprises a first set of elements, wherein: the first set of elements comprises a first number of elements equal to or less than a total number of: PRS measurements, PRS resources, PRS resources sets, transmission and reception points (TRPs), or frequency layers, or a combination thereof, with which the UE is configured; each element in the first consistency group corresponds to: a PRS measurement, a PRS resource, a PRS resource set, a TRP, or a frequency layer, or a combination thereof; and the first consistency group is associated with: a threshold, and a position estimate of the UE determined from at least a first subset of elements of the first consistency group for which an accuracy of the position estimate is estimated to be within the threshold.

Clause 2. The method of clause 1, further comprising determining a second set of one or more elements for which the accuracy of the position estimate of the UE determined from one or more elements of the second set is estimated to be beyond the threshold.

Clause 3. The method of any of clauses 1-2 wherein the device comprises a location server, and the method further comprises: receiving, from the location server, assistance data indicating TRP positions, wherein the information about the first consistency group is determined based on the TRP positions.

Clause 4. The method of clause 3 further comprising determining the information by at least performing an outlier detection algorithm on the PRS measurements, wherein the TRP positions are input to the outlier detection algorithm.

Clause 5. The method of any of clauses 1-4 further comprising receiving, from a location server, configuration information associated with parameters for one or more consistency groups; and determining the first consistency group based on: the parameters, and the performed measurements.

Clause 6. The method of clause 5 wherein the parameters indicate: a number of consistency groups to determine, a number of elements per consistency group, a minimum subset size to generate a position estimate per consistency group, or an estimate threshold per consistency group, or a combination thereof.

Clause 7. The method of any of clauses 1-6 further comprising determining the first consistency group based on: predefined parameters, and the performed measurements.

Clause 8. The method of any of clauses 1-7 wherein the predefined parameters are stored at the UE and indicate: a number of consistency groups to determine, a number of elements per consistency group, a minimum subset size to generate a position estimate per consistency group, or an estimate threshold per consistency group, or a combination thereof.

Clause 9. The method of any of clauses 1-8 further comprising sending, to the device, a plurality of sets of information, each set of information corresponding to a respective consistency group of a plurality of consistency groups.

Clause 10. The method of clause 9 wherein each one of the plurality of consistency groups is associated with: a number of elements for the consistency group, a minimum subset size to generate a position estimate for the consistency group, or an estimate threshold for the consistency group that is different from another estimate threshold for another consistency group, or a combination thereof.

Clause 11. The method of any of clauses 1-10 further comprising sending, to the device, a plurality of sets of information, each set of information corresponding to a respective set of consistency groups for a positioning measurement report from one or more positioning measurement reports.

Clause 12. The method of clause 11 wherein a first set of information about consistency groups for a time difference of arrival (TDOA) positioning measurement report is the same as a second set of information about consistency groups for a round trip time (RTT) positioning measurement report.

Clause 13. The method of clause 11 wherein for a TDOA positioning measurement report the first subset of elements comprises at least four elements; and for a round trip time (RTT) positioning measurement report the first subset of elements comprises at least three elements.

Clause 14. The method of any of clauses 1-13 further comprising sending, to the device, a measurement report that identifies, for each positioning method, one or more consistency groups and elements included in each one of the one or more consistency groups.

Clause 15. The method of any of clauses 1-14 wherein the information identifies: one or more TRPs that belong to the first consistency group, one or more PRS resource sets that belong to the first consistency group, a plurality of PRS resources that belong to the first consistency group, or a timestamp associated with the first consistency group, or a combination thereof.

Clause 16. The method of any of clauses 1-15 wherein the information identifies the first consistency group and a hierarchy of: one or more TRPs that belong to the first consistency group, one or more PRS resources per TRP of the first consistency group, and one or more PRS resources per PRS resource set of the first consistency group.

Clause 17. The method of any of clauses 1-16 wherein the information comprises an identifier of the first consistency group and sending the information comprises sending to the device: a time difference of arrival (TDOA) measurement element that includes a reference signal time difference (RSTD) measurement and the identifier, a round trip time (RTT) measurement element that includes a reception-transmission time difference (Rx-Tx) measurement and the identifier, or an angle of departure (AoD) measurement element that includes a reference signal received power (RSRP) measurement and the identifier, or a combination thereof.

Clause 18. The method of any of clauses 1-17 wherein the device comprises a location server, and wherein the information about the first consistency group is sent in a message to: the location server during a positioning session between the UE and the location server, or via a sidelink connection between the UE and a second UE.

Clause 19. The method of clause 18 wherein the information identifies the first consistency group and one or more TRPs that belong to the first consistency group.

Clause 20. The method of clause 19 wherein the information identifies a plurality of TRPs and whether each one of the plurality of TRPs is associated with the first consistency group.

Clause 21. The method of any of clauses 1-20 wherein measuring the positioning reference signals comprises measuring times of arrival (TOAs) of the positioning reference signals, and wherein the threshold corresponds to a TOA error threshold.

Clause 22. A user equipment (UE) for reporting measurement consistencies in support of positioning, the UE comprising: a transceiver; a memory; and one or more processors communicatively coupled with the transceiver and the memory, wherein the one or more processors are configured to: receive positioning reference signal (PRS) resources via the transceiver; perform measurements based on the PRS resources; and send via the transceiver, to a device based on the performed measurements, information about a first consistency group that comprises a first set of elements, wherein: the first set of elements comprises a first number of elements equal to or less than a total number of: PRS measurements, PRS resources, PRS resources sets, transmission and reception points (TRPs), or frequency layers, or a combination thereof, with which the UE is configured;

each element in the first consistency group corresponds to: a PRS measurement, a PRS resource, a PRS resource set, a TRP, or a frequency layer, or a combination thereof; and the first consistency group is associated with: a threshold, and a position estimate of the UE determined from at least a first subset of elements of the first consistency group for which an accuracy of the position estimate is estimated to be within the threshold.

Clause 23. The UE of clause 22, wherein the one or more processors are further configured to determine a second set of one or more elements for which the accuracy of the position estimate of the UE determined from one or more elements of the second set is estimated to be beyond the threshold.

Clause 24. The UE of any of clauses 22-23 wherein the device comprises a location server, and the one or more processors are further configured to receive, from the location server, assistance data indicating TRP positions, wherein the information about the first consistency group is determined based on the TRP positions.

Clause 25. The UE of clause 24 wherein the one or more processors are further configured to determine the information by at least performing an outlier detection algorithm on the PRS measurements, wherein the TRP positions are input to the outlier detection algorithm.

Clause 26. The UE of any of clauses 22-25 wherein the one or more processors are further configured to: receive, from a location server, configuration information associated with parameters for one or more consistency groups; and determine the first consistency group based on: the parameters, and the performed measurements.

Clause 27. The UE of any of clauses 22-26 wherein the one or more processors are further configured to determine the first consistency group based on: predefined parameters, and the performed measurements.

Clause 28. The UE of any of clauses 22-27 wherein the one or more processors are further configured to store the predefined parameters in the memory, wherein the predefined parameters indicate: a number of consistency groups to determine, a number of elements per consistency group, a minimum subset size to generate a position estimate per consistency group, or an estimate threshold per consistency group, or a combination thereof.

Clause 29. The UE of any of clauses 22-28 wherein the one or more processors are further configured to send, to the device via the transceiver, a plurality of sets of information, each set of information corresponding to a respective consistency group of a plurality of consistency groups.

Clause 30. The UE of any of clauses 22-29 wherein the one or more processors are further configured to send, to the device via the transceiver, a plurality of sets of information, each set of information corresponding to a respective set of consistency groups for a positioning measurement report from one or more positioning measurement reports.

Clause 31. The UE of any of clauses 22-30 wherein the one or more processors are further configured to send, to the device via the transceiver, a measurement report that identifies, for each positioning method, one or more consistency groups and elements included in each one of the one or more consistency groups.

Clause 32. The UE of any of clauses 22-31 wherein the one or more processors are configured to include, in the information, information that identifies: one or more TRPs that belong to the first consistency group, one or more PRS resource sets that belong to the first consistency group, a plurality of PRS resources that belong to the first consistency group, or a timestamp associated with the first consistency group, or a combination thereof.

Clause 33. The UE of any of clauses 22-32 wherein the one or more processors are configured to include, in the information, information that identifies the first consistency group and a hierarchy of: one or more TRPs that belong to the first consistency group, one or more PRS resources per TRP of the first consistency group, and one or more PRS resources per PRS resource set of the first consistency group.

Clause 34. The UE of any of clauses 22-33 wherein the one or more processors are configured to include, in the information, an identifier of the first consistency group, and wherein, to send the information, the one or more processors are configured to send: a time difference of arrival (TDOA) measurement element that includes a reference signal time difference (RSTD) measurement and the identifier, a round trip time (RTT) measurement element that includes a reception-transmission time difference (Rx-Tx) measurement and the identifier, or an angle of departure (AoD) measurement element that includes a reference signal received power (RSRP) measurement and the identifier, or a combination thereof.

Clause 35. The UE of any of clauses 22-34 wherein the device comprises a location server, and wherein the one or more processors are configured to send information about the first consistency group in a message to: the location server during a positioning session between the UE and the location server, or via a sidelink connection between the UE and a second UE.

Clause 36. The UE of clause 35 wherein the one or more processors are configured to include, in the information, information that identifies the first consistency group and one or more TRPs that belong to the first consistency group.

Clause 37. The UE of clause 36 wherein the one or more processors are further configured to include, in the information, information that identifies a plurality of TRPs and whether each one of the plurality of TRPs is associated with the first consistency group.

Clause 38. The UE of any of clauses 22-37 wherein to measure the positioning reference signals the one or more processors are configured to measure times of arrival (TOAs) of the positioning reference signals, and wherein the threshold corresponds to a TOA error threshold.

Clause 39. An apparatus for reporting measurement consistencies in support of positioning user equipment (UE), the apparatus comprising: means for receiving positioning reference signal (PRS) resources; means for performing measurements based on the PRS resources; and means for sending, to a device based on the performed measurements, information about a first consistency group that comprises a first set of elements, wherein: the first set of elements comprises a first number of elements equal to or less than a total number of: PRS measurements, PRS resources, PRS resources sets, transmission and reception points (TRPs), or frequency layers, or a combination thereof, with which the UE is configured; each element in the first consistency group corresponds to: a PRS measurement, a PRS resource, a PRS resource set, a TRP, or a frequency layer, or a combination thereof; and the first consistency group is associated with: a threshold, and a position estimate of the UE determined from at least a first subset of elements of the first consistency group for which an accuracy of the position estimate is estimated to be within the threshold.

Clause 40. A non-transitory computer-readable medium storing instructions for reporting measurement consistencies in support of positioning user equipment (UE), the instructions comprising code for: receiving positioning reference signal (PRS) resources; performing measurements based on the PRS resources; and sending, to a device based on the performed measurements, information about a first consistency group that comprises a first set of elements, wherein: the first set of elements comprises a first number of elements equal to or less than a total number of: PRS measurements, PRS resources, PRS resources sets, transmission and reception points (TRPs), or frequency layers, or a combination thereof, with which the UE is configured; each element in the first consistency group corresponds to: a PRS measurement, a PRS resource, a PRS resource set, a TRP, or a frequency layer, or a combination thereof; and the first consistency group is associated with: a threshold, and a position estimate of the UE determined from at least a first subset of elements of the first consistency group for which an accuracy of the position estimate is estimated to be within the threshold.

What is claimed is:

1. A method for reporting measurement consistencies in support of positioning, the method implemented by a user equipment (UE) and comprising:
   receiving positioning reference signal (PRS) resources;
   performing measurements based on the PRS resources; and
   sending, to a device based on the performed measurements, information about a first consistency group that comprises a first set of elements, wherein:
      the first set of elements comprises a first number of elements equal to or less than a total number of: PRS measurements, PRS resources, PRS resources sets, transmission and reception points (TRPs), or frequency layers, or a combination thereof, with which the UE is configured;
      each element in the first consistency group corresponds to: a PRS measurement, a PRS resource, a PRS resource set, a TRP, or a frequency layer, or a combination thereof; and
      the first consistency group is associated with:
         (i) a threshold, and
         (ii) a position estimate of the UE determined from at least a first subset of elements of the first consistency group for which an accuracy of the position estimate is estimated to be within the threshold.

2. The method of claim 1, further comprising determining a second set of one or more elements for which the accuracy of the position estimate of the UE determined from one or more elements of the second set is estimated to be beyond the threshold.

3. The method of claim 1, wherein the device comprises a location server, and the method further comprises:
   receiving, from the location server, assistance data indicating TRP positions, wherein the information about the first consistency group is determined based on the TRP positions.

4. The method of claim 3, further comprising:
   determining the information by at least performing an outlier detection algorithm on the PRS measurements, wherein the TRP positions are input to the outlier detection algorithm.

5. The method of claim 1, further comprising:
   receiving, from a location server, configuration information associated with parameters for one or more consistency groups; and
   determining the first consistency group based on:
      the parameters, and
      the performed measurements.

6. The method of claim 5, wherein the parameters indicate:
   a number of consistency groups to determine,
   a number of elements per consistency group,
   a minimum subset size to generate a position estimate per consistency group, or
   an estimate threshold per consistency group, or
   a combination thereof.

7. The method of claim 1, further comprising:
   determining the first consistency group based on:
      predefined parameters, and
      the performed measurements.

8. The method of claim 7, wherein the predefined parameters are stored at the UE and indicate:
   a number of consistency groups to determine,
   a number of elements per consistency group,
   a minimum subset size to generate a position estimate per consistency group, or
   an estimate threshold per consistency group, or
   a combination thereof.

9. The method of claim 1, further comprising sending, to the device, a plurality of sets of information, each set of information corresponding to a respective consistency group of a plurality of consistency groups.

10. The method of claim 9, wherein each one of the plurality of consistency groups is associated with:
    a number of elements for the consistency group,
    a minimum subset size to generate a position estimate for the consistency group, or
    an estimate threshold for the consistency group that is different from another estimate threshold for another consistency group, or
    a combination thereof.

11. The method of claim 1, further comprising:
    sending, to the device, a plurality of sets of information, each set of information corresponding to a respective set of consistency groups for a positioning measurement report from one or more positioning measurement reports.

12. The method of claim 11, wherein a first set of information about consistency groups for a time difference of arrival (TDOA) positioning measurement report is the same as a second set of information about consistency groups for a round trip time (RTT) positioning measurement report.

13. The method of claim 11, wherein:
    for a TDOA positioning measurement report the first subset of elements comprises at least four elements; and
    for a round trip time (RTT) positioning measurement report the first subset of elements comprises at least three elements.

14. The method of claim 1, further comprising:
    sending, to the device, a measurement report that identifies, for each positioning method, one or more consistency groups and elements included in each one of the one or more consistency groups.

15. The method of claim 1, wherein the information identifies:
    one or more TRPs that belong to the first consistency group,
    one or more PRS resource sets that belong to the first consistency group,
    a plurality of PRS resources that belong to the first consistency group, or
    a timestamp associated with the first consistency group, or
    a combination thereof.

16. The method of claim 1, wherein the information identifies the first consistency group and a hierarchy of:
   one or more TRPs that belong to the first consistency group,
   one or more PRS resources per TRP of the first consistency group, and
   one or more PRS resources per PRS resource set of the first consistency group.

17. The method of claim 1, wherein the information comprises an identifier of the first consistency group and sending the information comprises sending to the device:
   a time difference of arrival (TDOA) measurement element that includes a reference signal time difference (RSTD) measurement and the identifier,
   a round trip time (RTT) measurement element that includes a reception-transmission time difference (Rx-Tx) measurement and the identifier, or
   an angle of departure (AoD) measurement element that includes a reference signal received power (RSRP) measurement and the identifier, or
   a combination thereof.

18. The method of claim 1, wherein the device comprises a location server, and wherein the information about the first consistency group is sent in a message to:
   the location server during a positioning session between the UE and the location server, or
   via a sidelink connection between the UE and a second UE.

19. The method of claim 18, wherein the information identifies the first consistency group and one or more TRPs that belong to the first consistency group.

20. The method of claim 19, wherein the information identifies a plurality of TRPs and whether each one of the plurality of TRPs is associated with the first consistency group.

21. The method of claim 1, wherein measuring the positioning reference signals comprises measuring times of arrival (TOAs) of the positioning reference signals, and wherein the threshold corresponds to a TOA error threshold.

22. A user equipment (UE) for reporting measurement consistencies in support of positioning, the UE comprising:
   a transceiver;
   a memory; and
   one or more processors communicatively coupled with the transceiver and the memory, wherein the one or more processors are configured to:
      receive positioning reference signal (PRS) resources via the transceiver;
      perform measurements based on the PRS resources; and
      send via the transceiver, to a device based on the performed measurements, information about a first consistency group that comprises a first set of elements, wherein:
         the first set of elements comprises a first number of elements equal to or less than a total number of: PRS measurements, PRS resources, PRS resources sets, transmission and reception points (TRPs), or frequency layers, or a combination thereof, with which the UE is configured;
         each element in the first consistency group corresponds to: a PRS measurement, a PRS resource, a PRS resource set, a TRP, or a frequency layer, or a combination thereof; and
         the first consistency group is associated with:
            a threshold, and
            a position estimate of the UE determined from at least a first subset of elements of the first consistency group for which an accuracy of the position estimate is estimated to be within the threshold.

23. The UE of claim 22, wherein the one or more processors are further configured to determine a second set of one or more elements for which the accuracy of the position estimate of the UE determined from one or more elements of the second set is estimated to be beyond the threshold.

24. The UE of claim 22, wherein the device comprises a location server, and the one or more processors are further configured to receive, from the location server, assistance data indicating TRP positions, wherein the information about the first consistency group is determined based on the TRP positions.

25. The UE of claim 24, wherein the one or more processors are further configured to determine the information by at least performing an outlier detection algorithm on the PRS measurements, wherein the TRP positions are input to the outlier detection algorithm.

26. The UE of claim 22, wherein the one or more processors are further configured to:
   receive, from a location server, configuration information associated with parameters for one or more consistency groups; and
   determine the first consistency group based on:
      the parameters, and
      the performed measurements.

27. The UE of claim 22, wherein the one or more processors are further configured to determine the first consistency group based on:
   predefined parameters, and
   the performed measurements.

28. The UE of claim 27, wherein the one or more processors are further configured to store the predefined parameters in the memory, wherein the predefined parameters indicate:
   a number of consistency groups to determine,
   a number of elements per consistency group,
   a minimum subset size to generate a position estimate per consistency group, or
   an estimate threshold per consistency group, or
   a combination thereof.

29. The UE of claim 22, wherein the one or more processors are further configured to send, to the device via the transceiver, a plurality of sets of information, each set of information corresponding to a respective consistency group of a plurality of consistency groups.

30. The UE of claim 22, wherein the one or more processors are further configured to send, to the device via the transceiver, a plurality of sets of information, each set of information corresponding to a respective set of consistency groups for a positioning measurement report from one or more positioning measurement reports.

31. The UE of claim 22, wherein the one or more processors are further configured to send, to the device via the transceiver, a measurement report that identifies, for each positioning method, one or more consistency groups and elements included in each one of the one or more consistency groups.

32. The UE of claim 22, wherein the one or more processors are configured to include, in the information, information that identifies:
   one or more TRPs that belong to the first consistency group, one or more PRS resource sets that belong to the first consistency group,
a plurality of PRS resources that belong to the first consistency group, or
a timestamp associated with the first consistency group, or a combination thereof.

33. The UE of claim 22, wherein the one or more processors are configured to include, in the information, information that identifies the first consistency group and a hierarchy of:
one or more TRPs that belong to the first consistency group,
one or more PRS resources per TRP of the first consistency group, and
one or more PRS resources per PRS resource set of the first consistency group.

34. The UE of claim 22, wherein the one or more processors are configured to include, in the information, an identifier of the first consistency group, and wherein, to send the information, the one or more processors are configured to send:
a time difference of arrival (TDOA) measurement element that includes a reference signal time difference (RSTD) measurement and the identifier,
a round trip time (RTT) measurement element that includes a reception-transmission time difference (Rx-Tx) measurement and the identifier, or
an angle of departure (AoD) measurement element that includes a reference signal received power (RSRP) measurement and the identifier, or
a combination thereof.

35. The UE of claim 22, wherein the device comprises a location server, and wherein the one or more processors are configured to send information about the first consistency group in a message to:
the location server during a positioning session between the UE and the location server, or
via a sidelink connection between the UE and a second UE.

36. The UE of claim 35, wherein the one or more processors are configured to include, in the information, information that identifies the first consistency group and one or more TRPs that belong to the first consistency group.

37. The UE of claim 36, wherein the one or more processors are further configured to include, in the information, information that identifies a plurality of TRPs and whether each one of the plurality of TRPs is associated with the first consistency group.

38. The UE of claim 22, wherein to measure the positioning reference signals the one or more processors are configured to measure times of arrival (TOAs) of the positioning reference signals, and wherein the threshold corresponds to a TOA error threshold.

39. An apparatus for reporting measurement consistencies in support of positioning, the apparatus comprising:
means for receiving positioning reference signal (PRS) resources;
means for performing measurements based on the PRS resources; and
means for sending, to a device based on the performed measurements, information about a first consistency group that comprises a first set of elements, wherein:
the first set of elements comprises a first number of elements equal to or less than a total number of: PRS measurements, PRS resources, PRS resources sets, transmission and reception points (TRPs), or frequency layers, or a combination thereof, with which a user equipment (UE) is configured;
each element in the first consistency group corresponds to: a PRS measurement, a PRS resource, a PRS resource set, a TRP, or a frequency layer, or a combination thereof; and
the first consistency group is associated with:
(i) a threshold, and
(ii) a position estimate of the UE determined from at least a first subset of elements of the first consistency group for which an accuracy of the position estimate is estimated to be within the threshold.

40. A non-transitory computer-readable medium storing instructions for reporting measurement consistencies in support of positioning, the instructions comprising code for:
receiving positioning reference signal (PRS) resources;
performing measurements based on the PRS resources; and
sending, to a device based on the performed measurements, information about a first consistency group that comprises a first set of elements, wherein:
the first set of elements comprises a first number of elements equal to or less than a total number of: PRS measurements, PRS resources, PRS resources sets, transmission and reception points (TRPs), or frequency layers, or a combination thereof, with which a user equipment (UE) is configured;
each element in the first consistency group corresponds to: a PRS measurement, a PRS resource, a PRS resource set, a TRP, or a frequency layer, or a combination thereof; and
the first consistency group is associated with:
(i) a threshold, and
(ii) a position estimate of the UE determined from at least a first subset of elements of the first consistency group for which an accuracy of the position estimate is estimated to be within the threshold.

* * * * *